US007133142B2

(12) United States Patent
Matsuura et al.

(10) Patent No.: US 7,133,142 B2
(45) Date of Patent: Nov. 7, 2006

(54) INFORMATION PROVIDING SYSTEM AND APPARATUS AND METHODS THEREFOR

(75) Inventors: Kenichiro Matsuura, Kanagawa (JP); Hiroshi Satomi, Kanagawa (JP); Satoshi Igeta, Kanagawa (JP); Atsushi Inoue, Tokyo (JP); Kosuke Ito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 784 days.

(21) Appl. No.: 09/909,040

(22) Filed: Jul. 19, 2001

(65) Prior Publication Data
US 2002/0044294 A1    Apr. 18, 2002

(30) Foreign Application Priority Data
Jul. 24, 2000    (JP)    ............................. 2000-222813

(51) Int. Cl.
*B41B 1/00*    (2006.01)
*G06F 15/00*    (2006.01)

(52) U.S. Cl. ................... 358/1.13; 358/1.14; 358/1.15; 709/203; 709/206

(58) Field of Classification Search ................ 709/203, 709/206, 230; 358/1.15, 1.13; 705/40; 710/105; 455/566
See application file for complete search history.

(56) References Cited

U.S. PATENT DOCUMENTS

| 4,370,645 | A | 1/1983 | Cason et al. |
| 4,503,428 | A | 3/1985 | Hashimoto et al. |
| 4,837,798 | A | 6/1989 | Cohen et al. |
| 4,893,333 | A | 1/1990 | Baran et al. |
| 5,218,458 | A | 6/1993 | Kochis et al. |
| 5,283,887 | A | 2/1994 | Zachery |
| 5,303,343 | A | 4/1994 | Ohya et al. |
| 5,495,344 | A | 2/1996 | Callaway, Jr. et al. |
| 5,555,100 | A | 9/1996 | Bloomfield et al. |
| 5,635,918 | A | 6/1997 | Tett |
| 5,675,507 | A | 10/1997 | Bobo, II |
| 5,691,708 | A | 11/1997 | Batchelder et al. |
| 5,742,905 | A | 4/1998 | Pepe et al. |
| 5,826,034 | A | 10/1998 | Albal |

(Continued)

FOREIGN PATENT DOCUMENTS

EP    0 880 268 A2    11/1998

(Continued)

OTHER PUBLICATIONS

A Full-Text Retrieval System with a Dynamic Abstract Generation Function, Miike, S., et al., Annual ACM Conf. on Research and Develop. in Information Retrieval, Proceeding of the 17th Annual Intl ACM SIGIR, ISNB 0-387-19889-X, 1994, p. 152-161.

(Continued)

*Primary Examiner*—Kimberly Williams
*Assistant Examiner*—Satwant Singh
(74) *Attorney, Agent, or Firm*—Cowan, Liebowitz & Latman, P.C.

(57) ABSTRACT

A net database retains a user conversion setting table for designating the destination of electronic mail for each user. Based on the contents of the user conversion setting table of the user, a determination module determines the destination of electronic mail received via a mail server. The determination module uses an appropriate conversion module to convert the data of the electronic mail so as to match the output format of the destination. The determination module provides the converted data to the designated destination. Since the contents of the transmission information are converted into a data format corresponding to the capacity of a receiving-side terminal, appropriate information can be provided to the receiving-side terminal.

10 Claims, 31 Drawing Sheets

U.S. PATENT DOCUMENTS

| | | | |
|---|---|---|---|
| 5,859,967 A | 1/1999 | Kaufeld et al. | |
| 5,862,347 A | 1/1999 | Suzuki et al. | |
| 5,881,233 A | 3/1999 | Toyoda et al. | |
| 5,930,777 A * | 7/1999 | Barber | 705/40 |
| 6,023,700 A | 2/2000 | Owens et al. | |
| 6,061,502 A * | 5/2000 | Ho et al. | 358/1.15 |
| 6,092,114 A | 7/2000 | Shaffer et al. | |
| 6,101,320 A | 8/2000 | Schuetze et al. | |
| 6,104,711 A | 8/2000 | Voit | |
| 6,108,709 A | 8/2000 | Shinomura et al. | |
| 6,119,137 A | 9/2000 | Smith et al. | |
| 6,212,550 B1 | 4/2001 | Segur | |
| 6,253,231 B1 | 6/2001 | Fujii | |
| 6,279,018 B1 | 8/2001 | Kudrolli et al. | |
| 6,330,628 B1 * | 12/2001 | Motoyama | 710/105 |
| 6,389,129 B1 | 5/2002 | Cowan | |
| 6,430,272 B1 | 8/2002 | Maruyama | |
| 6,477,565 B1 | 11/2002 | Daswani et al. | |
| 6,493,105 B1 * | 12/2002 | Onuma | 358/1.15 |
| 6,493,107 B1 * | 12/2002 | Toyoda et al. | 358/1.15 |
| 6,546,417 B1 * | 4/2003 | Baker | 709/206 |
| 6,618,763 B1 | 9/2003 | Steinberg | |
| 6,625,642 B1 * | 9/2003 | Naylor et al. | 709/206 |
| 6,629,130 B1 | 9/2003 | Mertama et al. | |
| 6,633,630 B1 | 10/2003 | Owens et al. | |
| 6,683,698 B1 * | 1/2004 | Toyoda et al. | 358/1.15 |
| 6,684,088 B1 * | 1/2004 | Halahmi | 455/566 |
| 6,775,026 B1 * | 8/2004 | Kato | 358/1.15 |
| 2001/0013871 A1 | 8/2001 | Kucmerowski | |
| 2002/0016818 A1 * | 2/2002 | Kirani et al. | 709/203 |

FOREIGN PATENT DOCUMENTS

| | | |
|---|---|---|
| EP | 1 058 199 A2 | 12/2000 |
| WO | WO 98/58332 | 12/1998 |
| WO | WO 00/40000 | 7/2000 |

OTHER PUBLICATIONS

Abstracting of Legal Cases: The Salomon Experience, Moens, M., et al., Intl Conf. on Artificial Intelligence and Law Proceedings, Australia, ISBN 0-89791-924-6, 1997, p. 114-122.

A Trainable Document Summarizer, Kupiec, J., et al., Xerox Research Center, Annual ACM Conf. on Research and Develop. in Information Retrieval, Proceeding of the 17th Annual Intl ACM SIGIR, ISBN 0-89791-714-6, 1995, p. 68-73.

* cited by examiner

FIG. 7

706a USER INFORMATION TABLE

| |
|---|
| USER ID |
| PASSWORD |
| USER NAME (LAST NAME) |
| USER NAME (FIRST NAME) |
| PHONETIC TRANSCRIPTIONS IN KANA FOR USER NAME (LAST NAME) |
| PHONETIC TRANSCRIPTIONS IN KANA FOR USER NAME (FIRST NAME) |
| CREDIT CARD COMPANY |
| CREDIT CARD NUMBER |
| VALID DATES OF CREDIT CARD |
| CHARGE RECORD |

706b USER HONE INFORMATION TABLE

FIG. 11

706e USER CONVERSION SETTING TABLE

| USER ID |
|---|
| DISPLAY ON WEB : ON |
| FUNCTION OF CONVERTING IMAGE FORMAT EXCEPT JPEG AND GIF INTO JPEG FORMAT WHEN ATTACHED IMAGE IS DISPLAYED ON WEB : ON |
| FUNCTION OF DISPLAYING ATTACHED WORDPROCESSOR DOCUMENT ON WEB : ON |
| USE PAY CONVERSION FOR WEB DISPLAY |
| TRANSFER TO PORTABLE TERMINAL : ON |
| FUNCTION OF CONVERTING ATTACHED IMAGE TO DISPLAYABLE SIZE : ON |
| FUNCTION OF DISPLAYING ABSTRACT OF ATTACHED WORDPROCESSOR DOCUMENT : ON |
| USE PAY CONVERSION FOR DISPLAY AT PORTABLE TERMINAL |
| TRANSFER TO FAX : ON |
| TRANSFER ATTACHED IMAGE TO FAX : ON |
| TRANSFER ATTACHED WORDPROCESSOR DOCUMENT TO FAX : ON |
| TRANSFER DESTINATION FAX (HOME, OFFICE, OR PORTABLE TERMINAL) |
| ALLOWABLE NUMBER OF FAX OUTPUT PAGES |
| USE PAY CONVERSION FOR FAX DISPLAY |

FIG. 12

706f CONVERSION MODULE

| CONVERSION MODULE ID |
|---|
| NAME |
| INPUT FORMAT (MIME) |
| INPUT FORMAT (EXTENSION) |
| OUTPUT FORMAT (MIME) |
| OUTPUT FORMAT (EXTENSION) |
| OUTPUT FORMAT (UNIQUE) |
| FEE |

FIG. 13

706g PORTABLE TERMINAL PERFORMANCE TABLE

| |
|---|
| PORTABLE TERMINAL MODEL NUMBER |
| PORTABLE TERMINAL CARRIER NAME |
| PORTABLE TERMINAL MODEL NUMBER |
| COLOR DISPLAY ENABLE FLAG |
| NUMBER OF COLORS |
| BIT COUNT PER COLOR |
| DISPLAYABLE MAXIMUM SIZE (VERTICAL) |
| DISPLAYABLE MAXIMUM SIZE (HORIZONTAL) |
| DISPLAYABLE IMAGE FORMAT (MIME) |

FIG. 17

| MEMBER REGISTRATION | | |
|---|---|---|
| DESIRED USER ID : | | —607 |
| PASSWORD : | | —608 |
| NAME (LAST NAME) : | | —609 |
| PHONETIC TRANSCRIPTIONS IN KANA FOR NAME (LAST NAME) : | | —610 |
| NAME (FIRST NAME) | | —611 |
| PHONETIC TRANSCRIPTIONS IN KANA FOR NAME (FIRST NAME) : | | —612 |
| TELEPHONE NUMBER : | | —613 |
| ADDRESS : | | —614 |
| TELEPHONE NUMBER : | | —615 |
| MAIL ADDRESS : | | —616 |
| CREDIT CARD COMPANY : | | —617 |
| CREDIT CARD NUMBER : | | —618 |
| VALID DATES OF CARD : | ☐ YEAR  ☐ MONTH | —619 |
| | OK          CANCEL | —621 |

```
PLEASE INPUT NECESSARY DATA FOR SERVICE YOU USE

TRANSFER FAX/MAIL TO HOME               ——— 622

TRANSFER FAX/MAIL TO OFFICE             ——— 623

TRANSFER FAX/MAIL TO PORTABLE TERMINAL  ——— 624
```

FIG. 20

```
┌─────────────────────────────────────────────────┐
│ DESIGNATE OFFICE TO WHICH FAX/MAIL IS TRANSFERRED│
│                                                  │
│  ZIP CODE :         [_____]──628         │
│                                                  │
│  ADDRESS :          [_____]──629         │
│                                                  │
│  NAME OF YOUR COMPANY :    [_____]──630  │
│                                                  │
│  NAME OF YOUR DEPARTMENT : [_____]──631  │
│                                                  │
│  TELEPHONE NUMBER : [_____]──632         │
│                                                  │
│  FAX NUMBER :       [_____]──633         │
│                                                  │
│  MAIL ADDRESS :     [_____]──634         │
│                                                  │
│  [ OK ]                                          │
│    │                                             │
│   635                                            │
└─────────────────────────────────────────────────┘
```

FIG. 21

DESIGNATE OFFICE TO WHICH FAX/MAIL IS TRANSFERRED

| TYPE : | PORTABLE TELEPHONE ▼ | —636 |
| CARRIER NAME : | ○△TELEPHONE COMPANY ▼ | —637 |
| TERMINAL MODEL NUMBER : | | —638 |
| TELEPHONE NUMBER : | | —639 |
| FAX NUMBER : | | —640 |
| MAIL ADDRESS : | | —641 |

13 UNREAD MAIL MESSAGES

| | From | Subject | |
|---|---|---|---|
| 1 | TShoutoku@AAA.go.jp | Hello | |
| 2 | HItou@BBB.ne.jp | Good Morning | |
| 3 | TItagaki@CCC.Co.jp | Good Afternoon | |
| 4 | YFukuzawa@AAA.co.jp | Good Evening | |
| 5 | INitobe@BBB.go.jp | Welcome | ~660 |
| 6 | SMurasaki@CCC.ne.jp | GENJI | |
| 7 | SNatume@AAA.ne.jp | I | |
| 8 | NOda@BBB.go.jp | IN OWARI | |
| 9 | HToyotomi@CCC.co.jp | IN OSAKA | |
| 10 | ITokugawa@AAA.go.jp | IN EDO | |

NEXT 3 MAIL MESSAGES ~661

INFORMATION PROVIDING SYSTEM AND APPARATUS AND METHODS THEREFOR

FIELD OF THE INVENTION

The present invention relates to an information providing system and apparatus, and methods therefor, which provide information to a user using an electronic mail system.

BACKGROUND OF THE INVENTION

In recent years, information providing services using the Internet are available upon preparing communication infrastructures and developing information communication techniques. The information providing services using the Internet can provide multimedia information including images and sounds as well as information using letters.

A user who receives an information providing service via the Internet registers a mail account for using electronic mail and can perform communication using electronic mail and exchange information with other users.

Electronic mail information is generally represented by text. However, a binary file such as application data (document file) prepared by a user can be attached to electronic mail information by a technique for encoding the binary file into text data and a technique for decoding encoded text data.

The radio communication infrastructures have been prepared, and information communication techniques have been developed. In addition, terminals using these infrastructures and information communication techniques have been downsized. Mobile portable terminals such as portable telephones as well as desktop personal computers can be connected to the Internet. As a result, users using electronic mail with portable terminals have abruptly been increasing.

A means for acquiring information circulated in the Internet is not limited to a personal computer but can extend to a portable terminal and electronic mail terminal. These terminals have a variety of limitations such as the limitation of receivable information quantity, the limitation of display capacity of a terminal such as a display size, color, and resolution, the unique physical limitation, and the unique limitation on capacity.

Under these circumstances, unless information communication is performed upon understanding the environments of the sender and recipient in advance, reception information which cannot be processed on the receiving side cannot be received and is hence discarded.

Communication using electronic mail with a portable terminal via the Internet is allowed. However, if a mail recipient does not notify a mail sender of limitations on information contents (e.g., attachment of a computer electronic file or binary file) and the number of characters processed per mail, information which cannot be properly received (discarded before arrival of mail to the terminal) by the recipient may be generated.

Some portable terminal mail addresses can make a user imagine that it is a portable terminal depending on its domain name. However, the portable terminal mail address belongs to a standard Internet mail address system. Some portable terminal users use as a portable terminal mail address a mail address used at a terminal (e.g., a desktop personal computer) having electronic mail reception limitations different from those of the portable terminal. A transmitting side cannot easily decide the information reception capacity of the recipient terminal. It is, therefore, very difficult for an electronic mail sender to predict the recipient environment and send information processed to be received by the recipient.

Electronic mail messages from which information is omitted are frequently transmitted via portable terminals at the present. Users have no choice for any means for avoiding this.

To avoid the above situation, a technique has already been available, in which electronic mail to a portable terminal is transferred to one account on a World Wide Web server before reception of the mail at the portable terminal, and the mail is browsed via the World Wide Web mechanism. This technique cannot cope with browsing a binary file or acquiring data although the limitation on the number of receivable characters at a portable terminal is canceled.

Assume that an electronic mail sender attaches a document file or the like prepared using any application. In this case, a user using only the portable terminal as an Internet connection means may not be able to browse this document due to the limitations on the display capacity of the portable terminal.

To map and display document information attached to electronic mail, even an Internet connection terminal having almost no limitations as a reception means such as a desktop personal computer in addition to a portable terminal requires an application used when a sender prepares an attached document to electronic mail and sends it to a mail receiving terminal, or an application compatible with the above application. Such an application or compatible application is not always present in the electronic mail receiving terminal. When the electronic mail receiving terminal does not have the application used when the sender prepares the attached document or the application compatible with it, the recipient cannot easily observe the information transmitted by the electronic mail sender.

Under these circumstances, the recipient cannot check information sent from the sender unless the recipient prepares with much labor an environment compatible with the transmission environment of the sender.

SUMMARY OF THE INVENTION

The present invention has been made in consideration of the above problems, and has as its object to allow determining the capacity of a receiving-side terminal, converting and reconfiguring the contents of transmission information so as to match the capacity of the receiving-side terminal, and providing appropriate information to the receiving terminal for the transmission information.

According to one aspect of the present invention, the foregoing object is attained by providing an information providing apparatus comprising: reception means for receiving transmission information to a user; decision means for deciding, on the basis of user information of the user, a destination of the transmission information received by the reception means; designation means for designating conversion such that data contained in the transmission information matches a format of the destination; and providing means for providing to the destination data whose format is converted by the designation of the designation means.

According to another aspect of the present invention, the foregoing object is attained by providing an information providing system comprising: user information retention means for retaining user information including designation of a destination of transmission information for each user; reception means for receiving transmission information to a user; decision for acquiring user information of the user from the user information retention means and deciding the destination of the received transmission information on the basis of the user information; conversion means for converting data contained in the transmission information so as to match a format of the destination; and providing means for providing the format-converted data to the destination.

According to another aspect of the present invention, the foregoing object is attained by providing an information providing method comprising: the reception step of receiving transmission information to a user; the decision step of deciding, on the basis of user information of the user, a destination of the transmission information received in the reception step; the designation step of designating conversion such that data contained in the transmission information matches a format of the destination; and the providing step of providing to the destination data whose format is converted by the designation in the designation step.

Further, according to another aspect of the present invention, the foregoing object is attained by providing an information providing method comprising: the user information retention step of retaining user information including designation of a destination of transmission information for each user; the reception step of receiving transmission information to a user; the decision step of acquiring user information of the user from the user information retention step and deciding the destination of the received transmission information on the basis of the user information; the conversion step of converting data contained in the transmission information so as to match a format of the destination; and the providing step of providing the format-converted data to the destination.

Furthermore, according to the present invention, a computer readable medium storing control program for a computer to execute the above information processing method.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 is a view showing the data configuration of a user information table;

FIG. 11 is a view showing the data configuration of a user conversion setting table;

FIG. 12 is a view showing the data configuration of a conversion module table;

FIG. 13 is a view showing the data configuration of a portable terminal performance table;

FIG. 17 is a view showing a dialog for member registration in the Web server in the net mail service according to this embodiment;

FIG. 18 is a view showing a dialog for designating a transfer destination in the Web server in the net mail service according to this embodiment;

FIG. 20 is a view showing a dialog for designating a transfer destination in the Web server in the net mail service according to this embodiment;

FIG. 21 is a view showing a dialog for designating a transfer destination in the Web server in the net mail service according to this embodiment;

FIG. 24 is a view showing a cover page in a display state of reception mail in the Web server in the net mail service according to this embodiment;

DETAILED DESCRIPTION OF THE PREFERRED EMBODIMENTS

Preferred embodiments of the present invention will now be described in detail in accordance with the accompanying drawings.

An embodiment will describe the following information providing service system. In this system, in providing information to a user using an electronic mail system, when information which cannot be mapped or displayed in the environment of a receiving-side terminal of electronic mail is transmitted, the user is notified of its abstract and a method of acquiring the information. Information which cannot be conventionally mapped or displayed under the environmental limitations can be provided to a recipient in a variety of forms.

<System Configuration>

A service system (to be referred to as a net mail service hereinafter) to be described in this embodiment is comprised of a mail server, a module for determining according to user settings whether information can be output to a medium wanted by a user and preparing a document suitable for the medium wanted by the user (this module will be referred to as a determination module hereinafter), a conversion module for converting a given specific format into another specific format (this module will be referred to as a conversion module hereinafter), a module for setting user information and the medium wanted by the user (this module will be referred to as a setting module hereinafter), and a memory for storing user information, intermedium conversion settings (to be referred to as user conversion settings), and data sent by mail (this memory will be referred to as a net database hereinafter).

Figure 1:
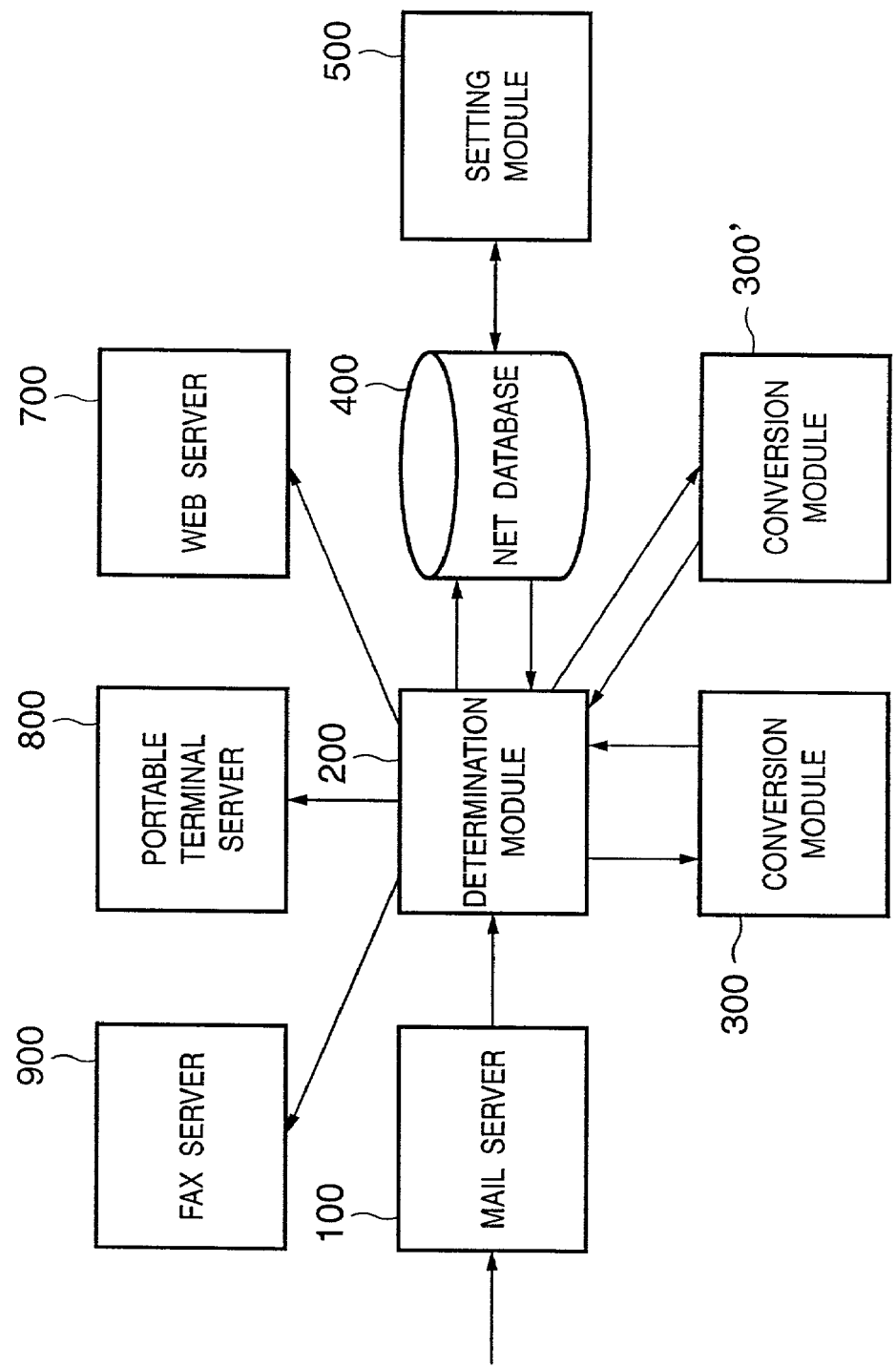
FIG. 1 is a block diagram showing the schematic arrangement of an information providing service system according to an embodiment.

FIG. 1 is a view for explaining the schematic arrangement of an information providing service of this embodiment. Referring to FIG. 1, reference numeral 100 denotes a mail server; 200, a determination module; 300 and 300', conversion modules; 500, a setting module; and 400, a net database. In this arrangement, mail received by the mail server 100 is divided into a mail text and attached file by the determination module 200. Each divided data is transferred to appropriate conversion module 300 in accordance with user conversion settings. A document suitable for each medium is prepared by the determination module 200 using the converted data. The document is sent to each medium such as a Web server 700, portable terminal server 800, or FAX server 900 and displayed and output. The contents of the user conversion settings used in determination in the determination module 200 are prepared and changed by the setting module 500. Each module will be described in detail below.

In this embodiment, in order to provide a more flexible service to a user, the user can set information in the setting module 500 to implement transfer of electronic mail to the designated Web server, FAX machine, or portable terminal. The setting module 500 can be omitted for fixed services. An example of the fixed services is to configure a system in which the transfer destination of electronic mail is fixed to a predetermined Web server, and the user traces the URL links to acquire his mail.

The mail server 100 may or may not operate on a server on which the determination module 200 is operating. The mail server need not perform only reception, or the mail server may be periodically accessed to obtain mail using a protocol such as POP3. It suffices in this embodiment that the mail server 100 is a general mail server having a means for transferring received data to other program modules.

The determination module 200 divides mail received by the mail server 100 into respective formats (a mail text and attached file). To convert the formats of the mail text and attached file so as to match media wanted by the user, user settings stored in the net database 400 are looked up to instruct the appropriate conversion modules 300 and 300' to perform conversion operations. Data returning from the conversion modules are used to prepare documents for media wanted by the user.

The conversion modules 300 and 300' are filters for converting specific formats to other specific formats. An example of the conversion module is a simplest module for converting the TIFF format as the image format to the JPEG format as another image format. The modules 300 and 300' perform conversion between specific formats. A plurality of conversion modules are used in accordance with the number of formats which can be processed by the determination module. The conversion modules 300 and 300' are illustrated in FIG. 1. Three or more conversion modules may be used, as a matter of course.

The setting module 500 serves as a mechanism for accepting user registration and user conversion settings and storing them in the net database 400. In this embodiment, the setting module 500 is activated by the Web server 700 using CGI. This does not means that settings cannot be done using a dedicated terminal. The settings and setting changes can be done by the dedicated terminal.

The net database 400 stores user registration contents, user conversion settings, charge information, and data contained in mail.

The Web server 700, portable terminal server 800, and FAX server 900 are connected to media (a computer with a Web browser, a portable terminal, and a facsimile machine) on which the conversion results are represented. In this embodiment, the Web server 700 is used also to access the setting module 500. However, the setting module 500 can be present in a physically different machine or single machine.

According to the above, data to be transferred to a portable terminal is transmitted to the portable terminal server 800, and data to be transferred to the FAX machine is transmitted to the FAX server 900. However, these data may be directly transmitted to the portable terminal and FAX machine.

In this embodiment, the Web server 700, portable terminal server 800, and FAX server 900 are used as information providing means for media on which the conversion results are represented. Other media can be used. For example, a conversion module for converting characters to sounds can be arranged. In this case, a voice telephone can be selected as a medium which represents the conversion result. The portable terminal and facsimile machine respectively connected to the portable terminal server 800 and FAX server 900 need not be dedicated ones.

As examples of services implemented by the above system, the following services will be mainly described in this embodiment.

(1) User registration: performs setting ID and password necessary for user authentication, information necessary for account, and personal information.

(2) Change in registration of user conversion settings: performs setting of a transfer destination used in a mail conversion service, and registration and change of conversion settings.

(3) Data display by Web: displays mail information converted into the Web format in accordance with user settings.

(4) Data display at portable terminal: displays mail information converted for a portable terminal in accordance with user settings.

(5) Data display at FAX machine: outputs mail information converted for a FAX machine in accordance with user settings.

(6) Mail conversion service: changes the mail contents into a format suitable for another medium in accordance with settings.

These services will be described in detail later. The services and functions of this embodiment are not limited to these.

<Arrangement of Mail Server>

Figure 2:
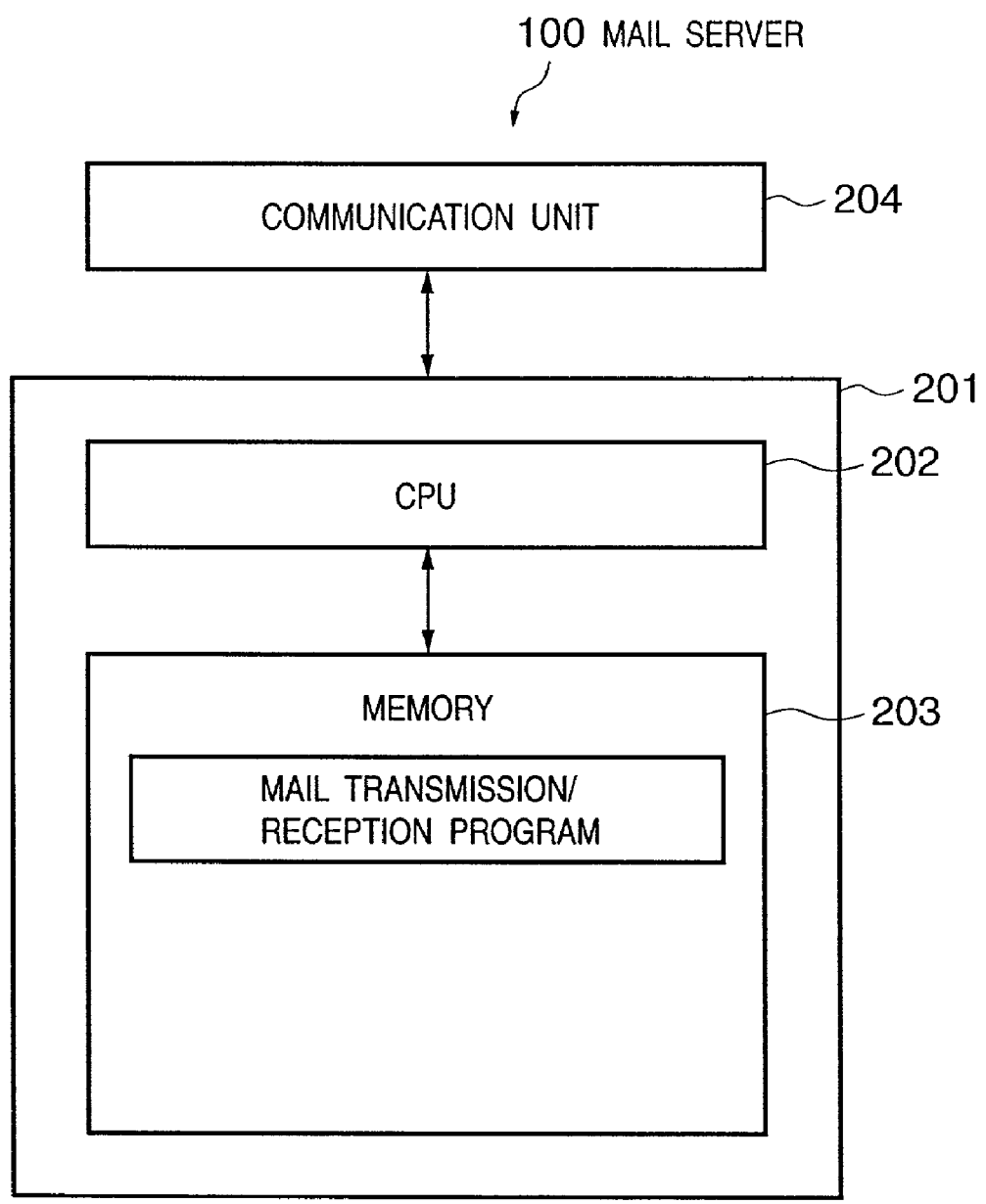
FIG. 2 is a block diagram showing the schematic arrangement of a mail server.

FIG. 2 is a block diagram showing the schematic arrangement of a mail server. Reference numeral 201 denotes a controller including a CPU 202 and memory 203. The CPU 202 executes a mail transmission/reception program stored in the memory 203 to implement control of transmission/ reception of mail. Reference numeral 204 denotes a communication unit 204 which exchanges mail data via a channel. The communication unit 204 stores the reception mail in the net database and accesses data on the net database in extracting data from the net database and transmitting it.

<Arrangement of Determination Module >

Figure 3:
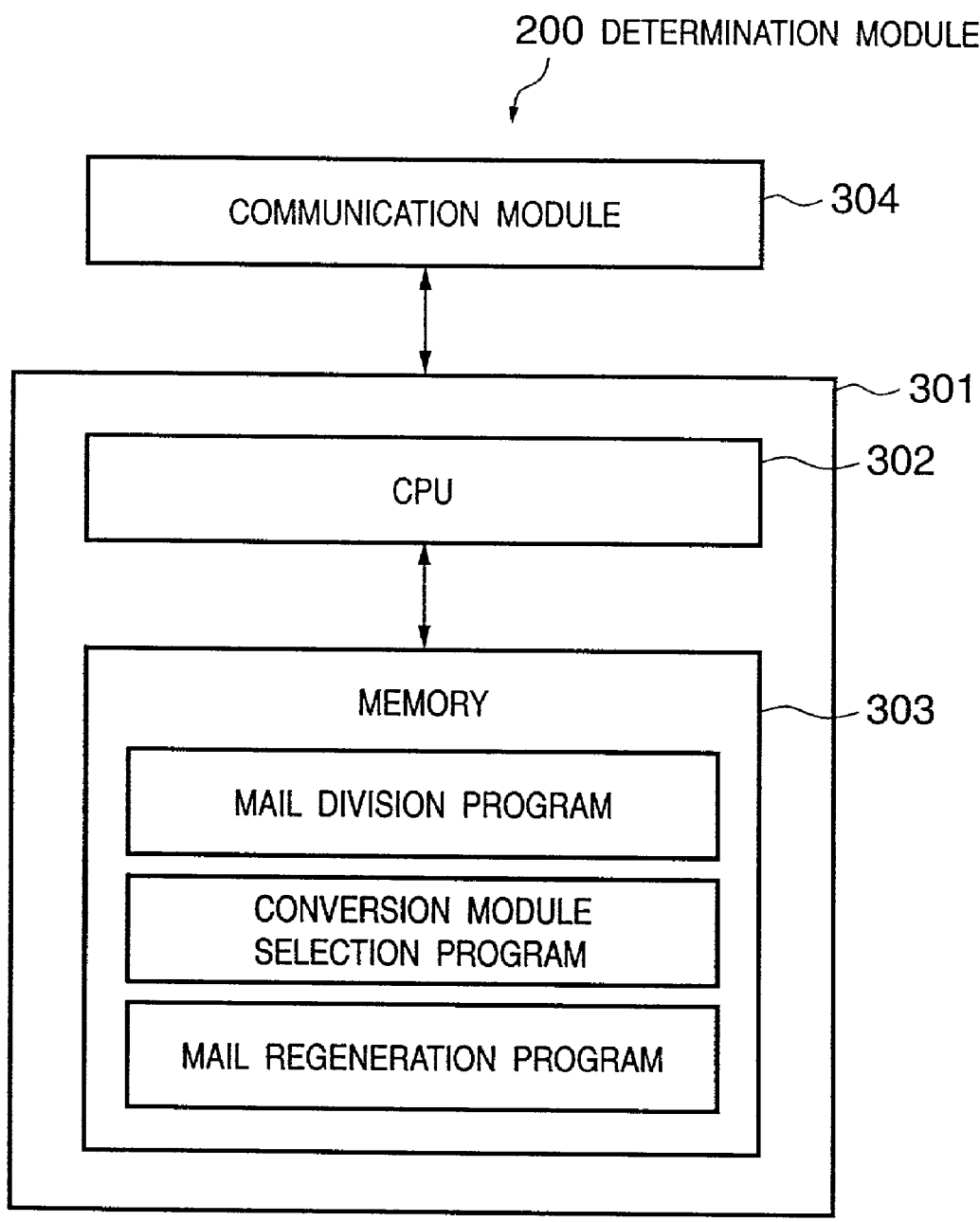
FIG. 3 is a block diagram showing the schematic arrangement of a determination module.

FIG. 3 is a block diagram showing the schematic arrangement of the determination module. Reference numeral 301 denotes a controller including a CPU 302 and memory 303. The CPU 302 executes a mail division program, conversion module selection program, and mail regeneration program stored in the memory 303, thereby implementing determinations about data conversion.

Reference numeral 304 denotes a communication unit which is used to access the data on the net database when extracting mail received and stored in the net database, and adding processed data to the net database. This communication unit is also used to exchange data with other models. In this embodiment, the determination module 200 arbitrates access between data on the net database and other modules and servers.

<Arrangement of Conversion Module>

Figure 4:
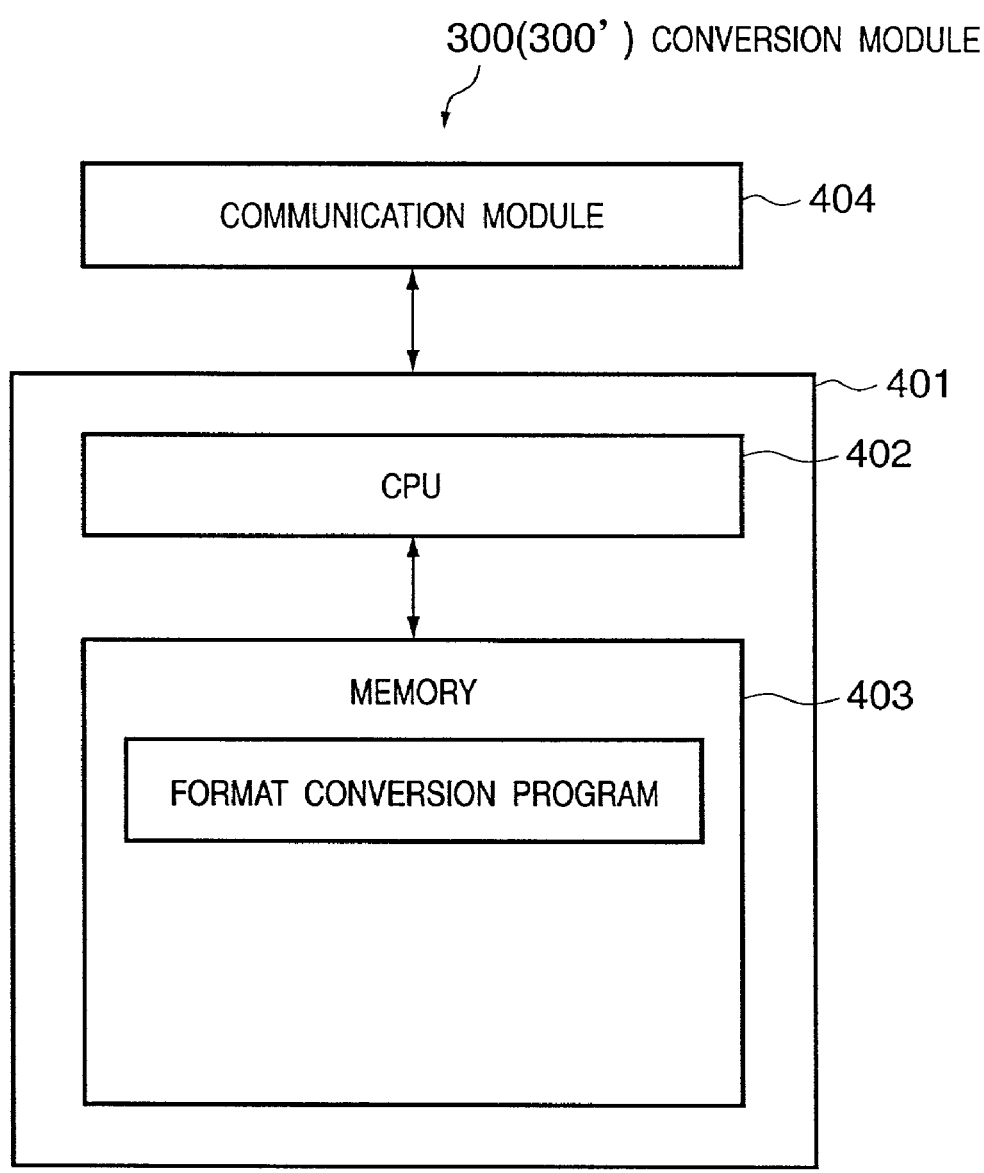
FIG. 4 is a block diagram showing the schematic arrangement of a conversion module.

FIG. 4 is a block diagram showing the schematic arrangement of a conversion module. Reference numeral 401 denotes a controller including a CPU 402 and memory 403. The CPU 402 executes a format conversion program stored in the memory 403 to implement conversion of provided data into a predetermined format. Reference numeral 404 denotes a communication unit used to access data on the net database when acquiring data before conversion from the net database, and storing the converted data in the net database. This communication unit is also used to exchange data with other modules.

<Arrangement of Setting Module>

Figure 5:
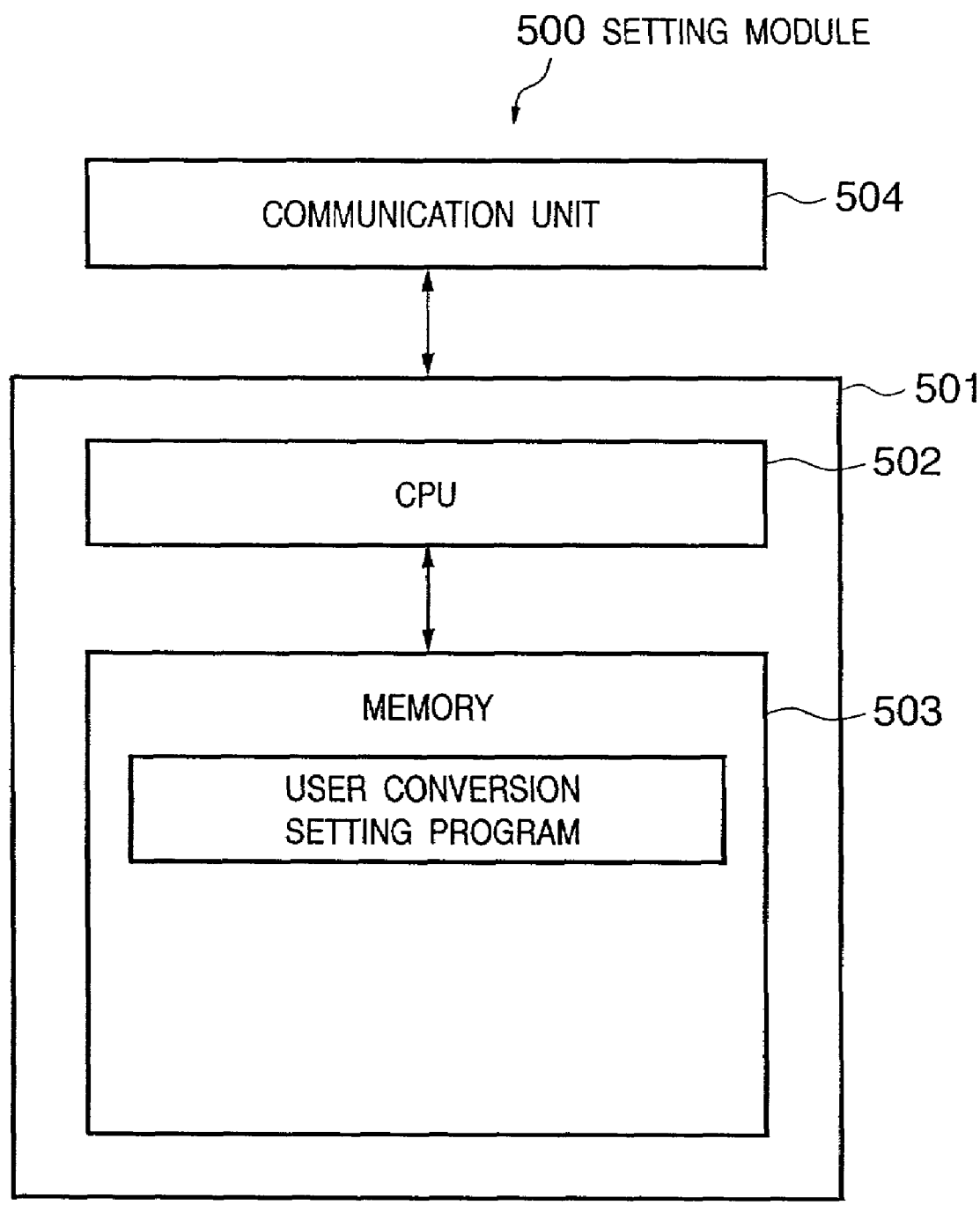
FIG. 5 is a block diagram showing the schematic arrangement of setting module.

FIG. 5 is a block diagram showing the schematic arrangement of a setting module. Reference numeral 501 denotes a controller including a CPU 502 and memory 503. The CPU 502 executes a user conversion setting program stored in the memory 503 to realize a change in user conversion settings. Reference numeral 504 denotes a communication unit used to access data on the net database when acquiring current user conversion settings from the net database, and storing the change result in the net database. This communication unit is also used when interacting with a user via a channel to receive an instruction about setting contents.

<Arrangement of Net Database>

Figure 6:
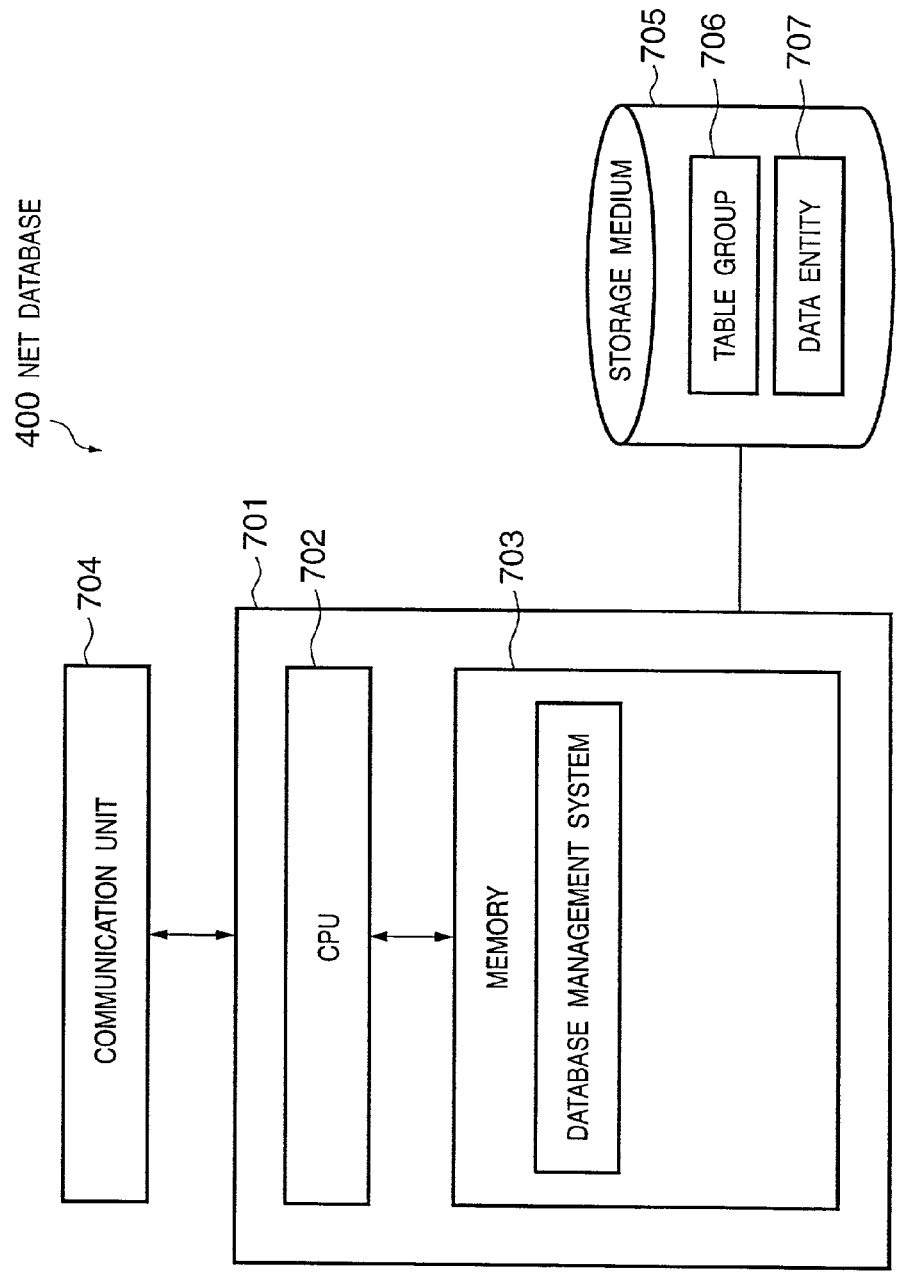
FIG. 6 is a block diagram showing the schematic arrangement of a net database.

FIG. 6 is a block diagram showing the schematic arrangement of a net database. Reference numeral 701 denotes a controller including a CPU 702 and memory 703. The CPU 702 executes a database management system stored in the memory 703 to implement management of data stored in a storage medium 705. Reference numeral 704 denotes a communication unit used to exchange data with other modules via a channel. The storage medium 705 stores data managed by the database management system. Examples of data to be stored are a table group 706 of user information and the like and a data entity 707 such as mail data.

The table group 706 includes a user information table (FIG. 7), user home information table (FIG. 8), user office information table (FIG. 9), user portable terminal information table (FIG. 10), user conversion setting table (FIG. 11), conversion module table (FIG. 12), and portable terminal performance table (FIG. 13).

FIG. 7 is a view showing the data configuration of a user information table 706a. The user information table 706a is generated and recorded in user registration and stores an ID and password used for user authentication, credit card information and charge records for user charge, and the like.

Figure 8:
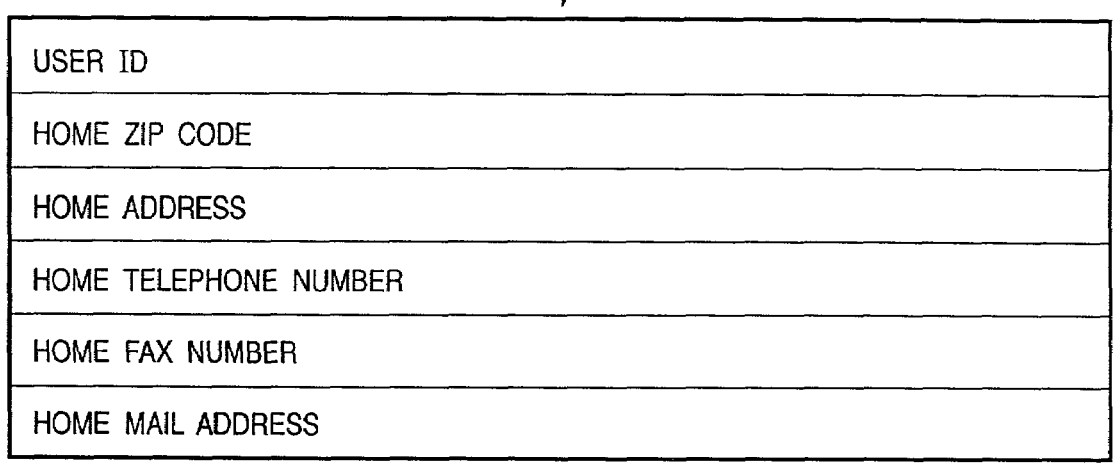
FIG. 8 is a view showing the data configuration of a user home information table.

FIG. 8 is a view showing the data configuration of a user home information table 706b. The user home information table 706b is generated and recorded at the time of user registration or use of the net mail service. The user home information table 706b stores a home telephone number and home address of the user, and corresponding medium IDs (e.g., a home FAX number and home mail address).

Figure 9:
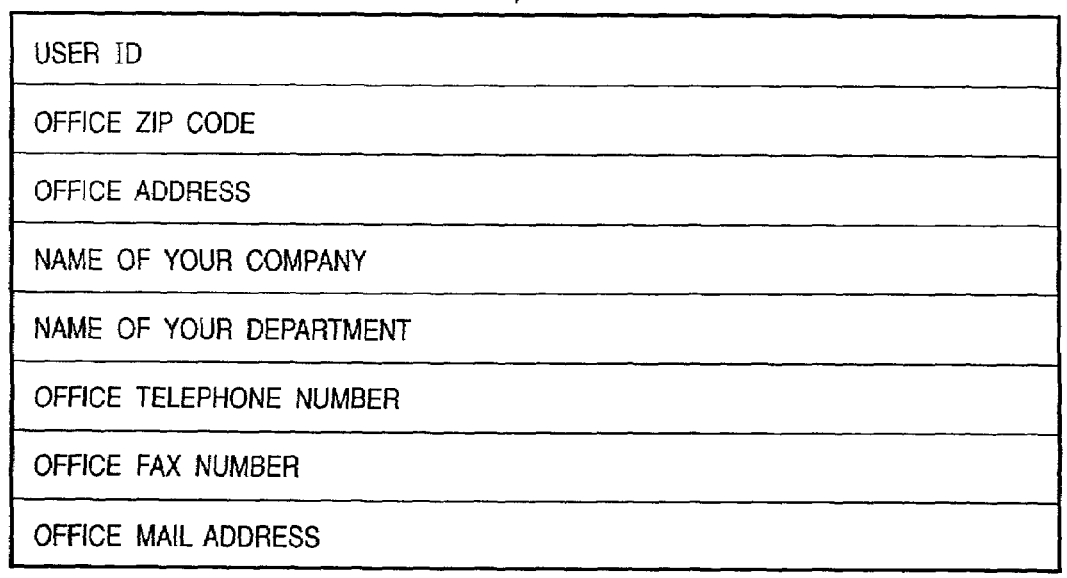
FIG. 9 is a view showing the data configuration of a user office information table.

FIG. 9 is a view showing the data configuration of a user office information table 706c. The user office information table 706c is generated and recorded at the time of user registration or use of the net mail service. The user office information table 706c stores an office telephone number and office address of the user and corresponding medium IDs (e.g., an office FAX number and office mail address).

Figure 10:
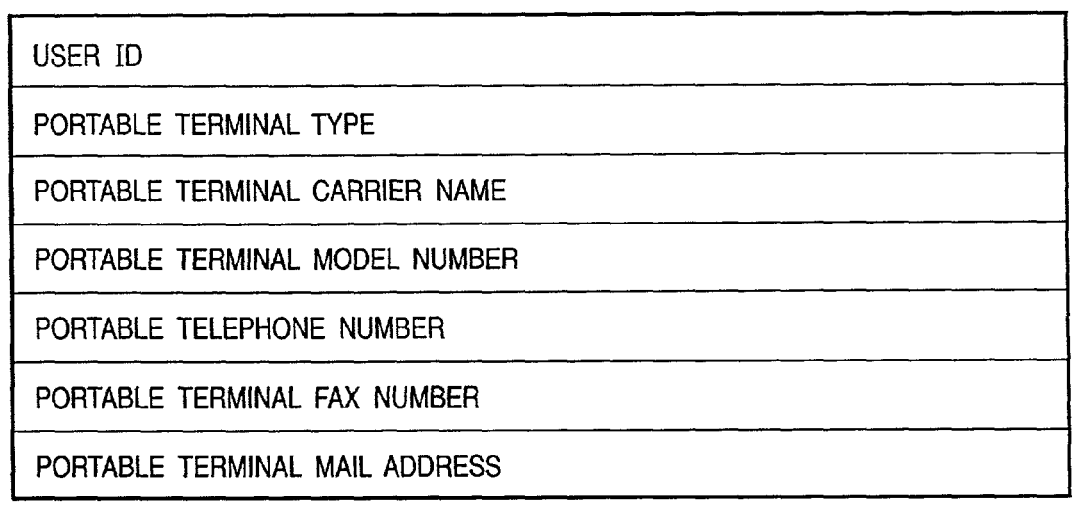
FIG. 10 is a view showing the data configuration of a user portable terminal information table.

FIG. 10 is a view showing the data configuration of a user portable terminal information table 706d. The user portable terminal information table 706d is generated and recorded at the time of user registration and use of the net mail service. The user portable terminal information table 706d stores information about the portable terminal of the user.

FIG. 11 is a view showing the data configuration of a user conversion setting table 706e. In this embodiment, the user conversion setting table 706e is used to set whether information is displayed or output at each medium via the Web server 700, portable terminal server 800, or FAX server 900. The user conversion setting table 706e is used to allow the user to so set as to send appropriate information to an appropriate device in using this service.

Using the setting module 500, the user can selectively displays (outputs) information at each medium via the Web server 700, portable terminal server 800, or FAX server 900. The user can also select the form of display of an attached document at each output destination.

Assume that mail attached with an image file is received while display on Web is selected. In this case, the image formats generally supported by the Web browser are limited to JPEG and GIF. In this case, in order to allow the user to observe an image with a format except JPEG and GIF, the user must have image display software corresponding to the format of the attached image. When a "function of converting an image format except JPEG and GIF into a JPEG format when an attached image is displayed on Web: ON" is selected, the image file is converted into a JPEG file and can be displayed on the Web browser. This also applies to a wordprocessor document. Note that image formats and wordprocessor documents whose conversion is supported are some of the disclosed formats. Note also that any format can be installed if it is disclosed.

Some formats not disclosed require pay conversion, and whether a pay conversion module is allowed can be selected.

The user need not select one of the Web server 700, portable terminal 800 and FAX 900, but can select a plurality of media or designate to display or output one mail message to all media. The contents to be displayed on the plurality of media need not be identical. For example, the mail text and the abstract of the attached wordprocessor document can be displayed at the portable terminal, while the whole text of the wordprocessor document can be output via FAX.

The data entity 707 includes raw data of sent mail, divided mail data, data converted by a conversion module for each medium, and a document prepared for each medium. Since divided mail data is stored in a data entity, interactive conversion with a user is possible. For example, when a document such as a wordprocessor document which cannot be browsed without using a pay conversion module is received, the user can send the document to the conversion module interactively, and observe it.

FIG. 12 is a view showing the data configuration of a conversion module table 706*f*. The conversion module table 706*f* is used to describe the characteristics of each conversion module (300 and 300'). The determination module 200 looks up the conversion module table 706*f* to allow selecting a conversion module whose input and output formats are appropriate. The input and output formats are generally determined by MIME and an extension. As shown in FIG. 11, since some data cannot be determined by only the MIME and extension, such as "abstract of the wordprocessor document", an "output format (unique)" is added.

Since the pay conversion module is present, as described with reference to FIG. 11, an item representing a charge per conversion page is also prepared. In this case, the conversion charge is determined per page, but may be determined in accordance with the data size.

FIG. 13 is a view showing the data configuration of a portable terminal performance table 706*g*. The portable terminal performance table 706*g* is used to describe the characteristics of portable terminals. The size of an image displayed on a portable terminal changes depending on the type of portable terminal. When an image is to be displayed on a portable terminal, a portable terminal type, portable terminal carrier name, and portable terminal model number stored in the user portable terminal information table 706*d* are obtained. The image display capacity of a portable terminal designated by these pieces of information can be checked. Therefore, an image suitable for the portable terminal can be prepared.

The description has been made on an assumption that the mail server 100, determination module 200, conversion module 300 (300'), setting module 500, and net database 400 are present in physically different machines. These components, however, can be present in a single machine. That is, the CPUs 302, 402, 502, and 702 can be a single CPU. In this case, the mail server 100, determination module 200, conversion module 300 (300'), and setting module 500 directly access the storage medium 705 without mediacy of the communication units 204, 304, 404, and 504.

<Outline of System Operation>

Figure 14:
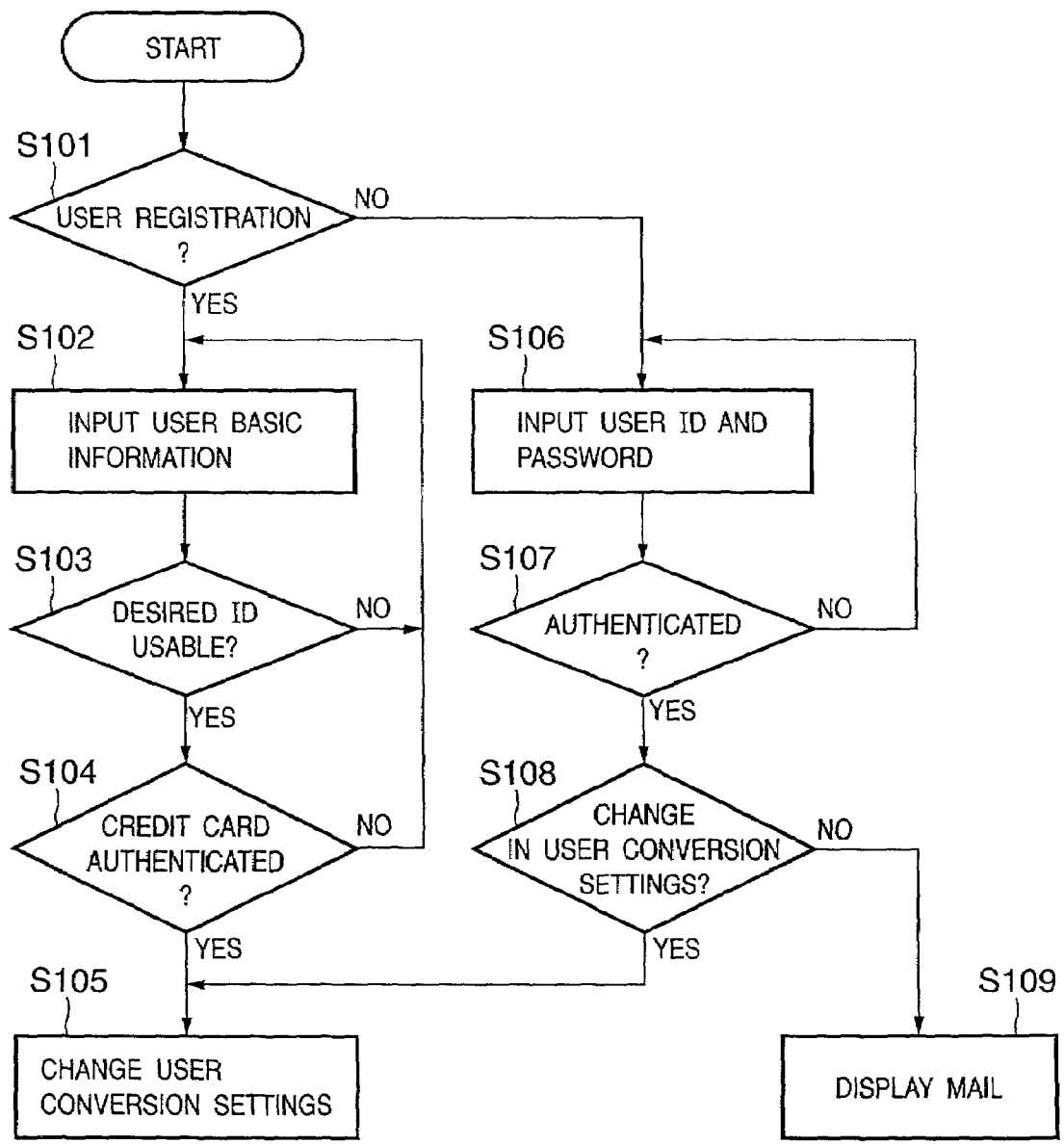
FIG. 14 is a flow chart showing the sequence for registering a user and registering user conversion settings.

To receive a service from the net mail service, the user and user conversion settings must be registered in advance. As described above, according to this embodiment, the user conversion settings are registered via the Web server. A sequence about registration of user conversion settings is shown in FIG. 14.

In step S101, whether user registration is done is determined. When user registration is not done yet, the flow advances from step S101 to step S102 to perform user registration operation. In step S102, user basic information and information for charge for the user are registered. In steps S103 and S104, whether a desired user ID can be used is determined, and the credit card is authenticated. If there is no problem, a prompt is displayed to fill additional information such as a portable telephone, facsimile machine, or telephone used for mail conversion and transfer and to select service contents (step S105).

If user registration has already been done, the user inputs his user ID and password in step S106. When the user is authenticated using the input ID and password, a change in user conversion settings (step S105) or mail display on the Web (step S109) is selected.

<User Registration>

Figure 15:
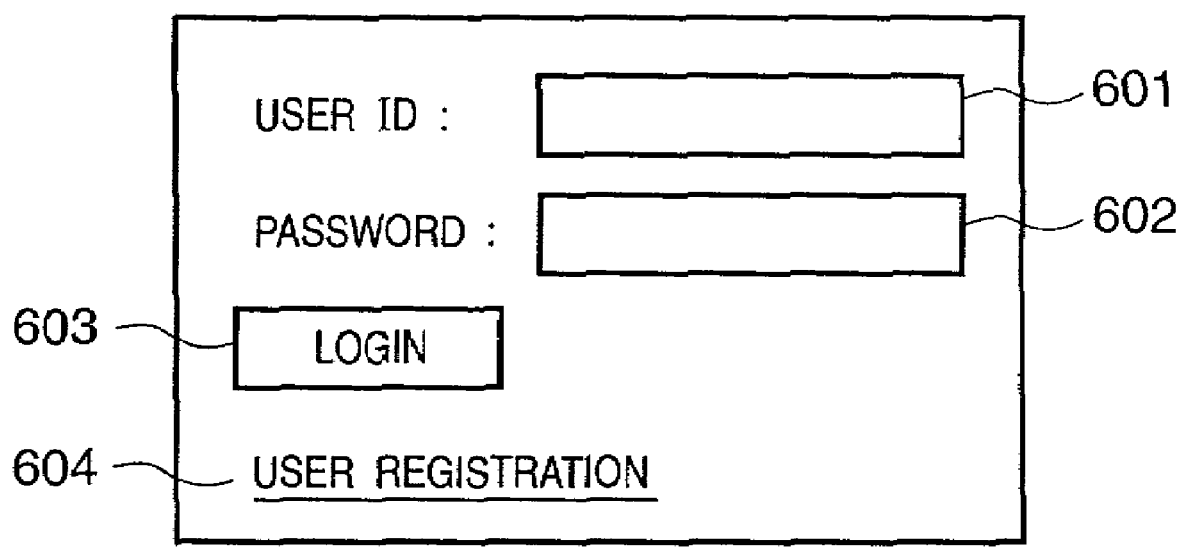
FIG. 15 is a view showing a cover page in a Web server in a net mail service according to this embodiment.
Figure 16:
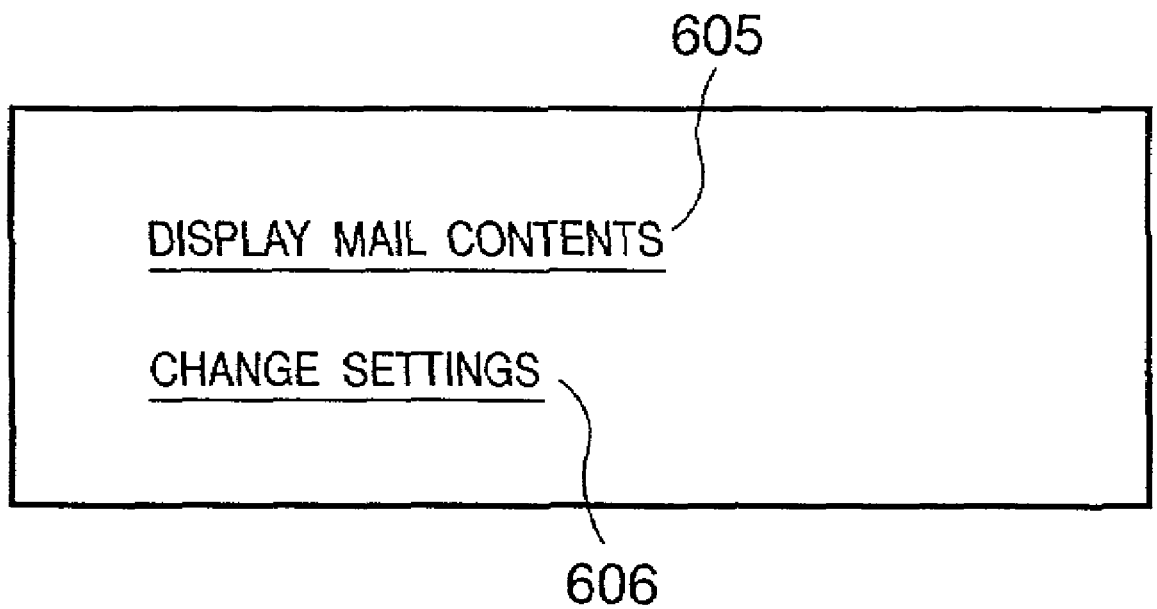
FIG. 16 is a view showing a cover page for user setting in the Web server in the net mail service according to this embodiment.

FIG. 15 shows a cover page (front page) of the net mail service in the Web server according to this embodiment. A user who has already obtained the user ID inputs his user ID in an area 601 and his password in an area 602 and clicks a login button 603. A window shown in FIG. 16 is displayed through user authentication (steps S101, S106, and S107). When a "change settings" 606 is clicked, a window for a change in registration of user conversion settings is displayed (steps S108 and S105). When a "display mail contents" 605 is clicked, a Web data display window (to be described later) appears (step S108 and S109).

When a "user registration" 604 in FIG. 15 is clicked, a window in FIG. 17, which serves as a window for registering a user is displayed (steps S101 and S102). All the information is filled in the areas 607 to 619 and an OK button 620 is clicked. When the ID desired by the user can be used, and credit card authentication is done without any problem, a window shown in FIG. 18 is displayed to allow user conversion settings (steps S103, S104, and S105). Note that the user information table 706*a* is generated on the basis of the information input on the window shown in FIG. 17.

Figure 19:
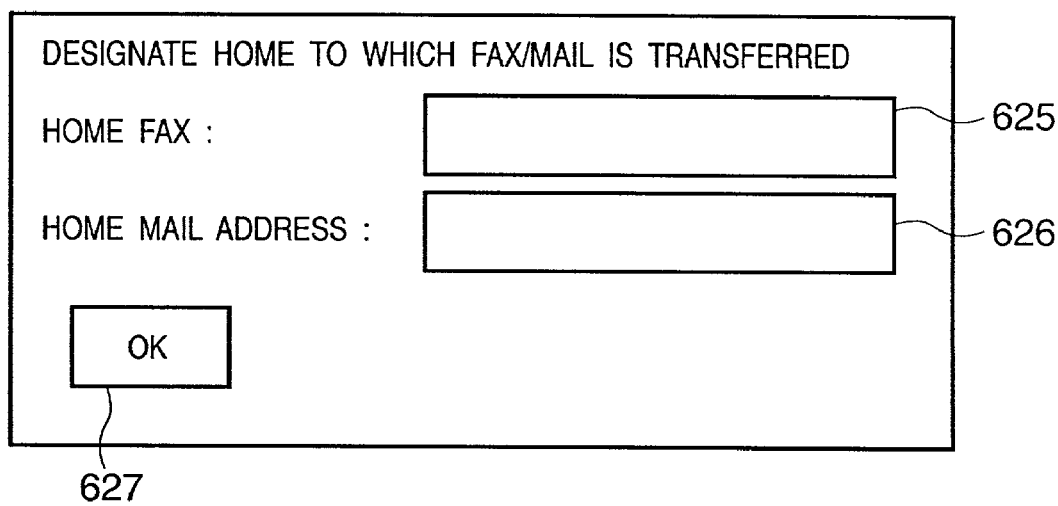
FIG. 19 is a view showing a dialog for designating a transfer destination in the Web server in the net mail service according to this embodiment.

When a "transfer FAX/mail to home" 622 in FIG. 18 is clicked, an input window shown in FIG. 19 is displayed. This window is used to input information on the home medium, and a FAX number and mail address are input to areas 625 and 626, as needed. The user home information table 706*b* is formed on the basis of these pieces of information.

A "transfer FAX/mail to office" 623 in FIG. 18 is clicked, an input window shown in FIG. 20 is displayed. The window shown in FIG. 20 is used to input information of office medium. The user inputs information of his office in areas 628 to 634, as needed. The user office information table 706*c* is generated on the basis of information input on the input window in FIG. 20.

When a "transfer FAX/mail to portable terminal" 624 in FIG. 18 is clicked, a window shown in FIG. 21 is displayed. The window in FIG. 21 is used to input information of a portable terminal. The user selects or input information of the portable terminal in areas 636 to 641, as needed. In this embodiment, for example, a type such as a portable telephone or pager can be selected for the area 636 from a pull-down menu. A carrier name can be selected for the area 637 from a pull-down menu. The model number of the portable terminal is input in the area 638. A mail address assigned to the portable terminal, if any, is input to the area 641. The user portable terminal information table 706*d* is generated on the basis of these pieces of information.

Information must be filled in for the items in FIG. 17 to identify the user. However, information for items in FIGS. 19, 20, and 21 is required to receive services and can be input, as needed.

<Change in Registration of User Conversion Settings>

Figure 22:
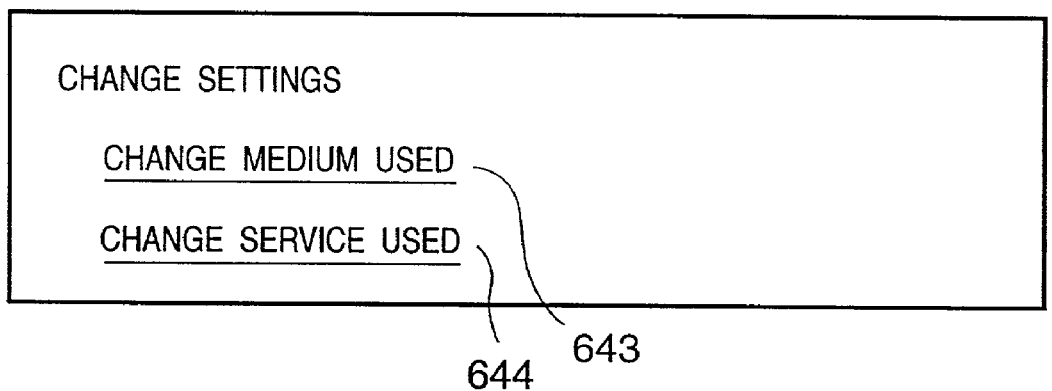
FIG. 22 is a view showing a cover page for changing the user settings in the Web server in the net mail service according to this embodiment.

A "change settings" 606 in FIG. 16 is clicked to display a window shown in FIG. 22 to change registration of the user conversion settings (steps S108 and S105). When a "change medium used" 643 is clicked, the window shown in FIG. 18 is displayed. Operations upon clicking on the areas 622, 623, and 624 have been described with reference to FIG. 18, and a detailed description thereof will be omitted.

Figure 23:
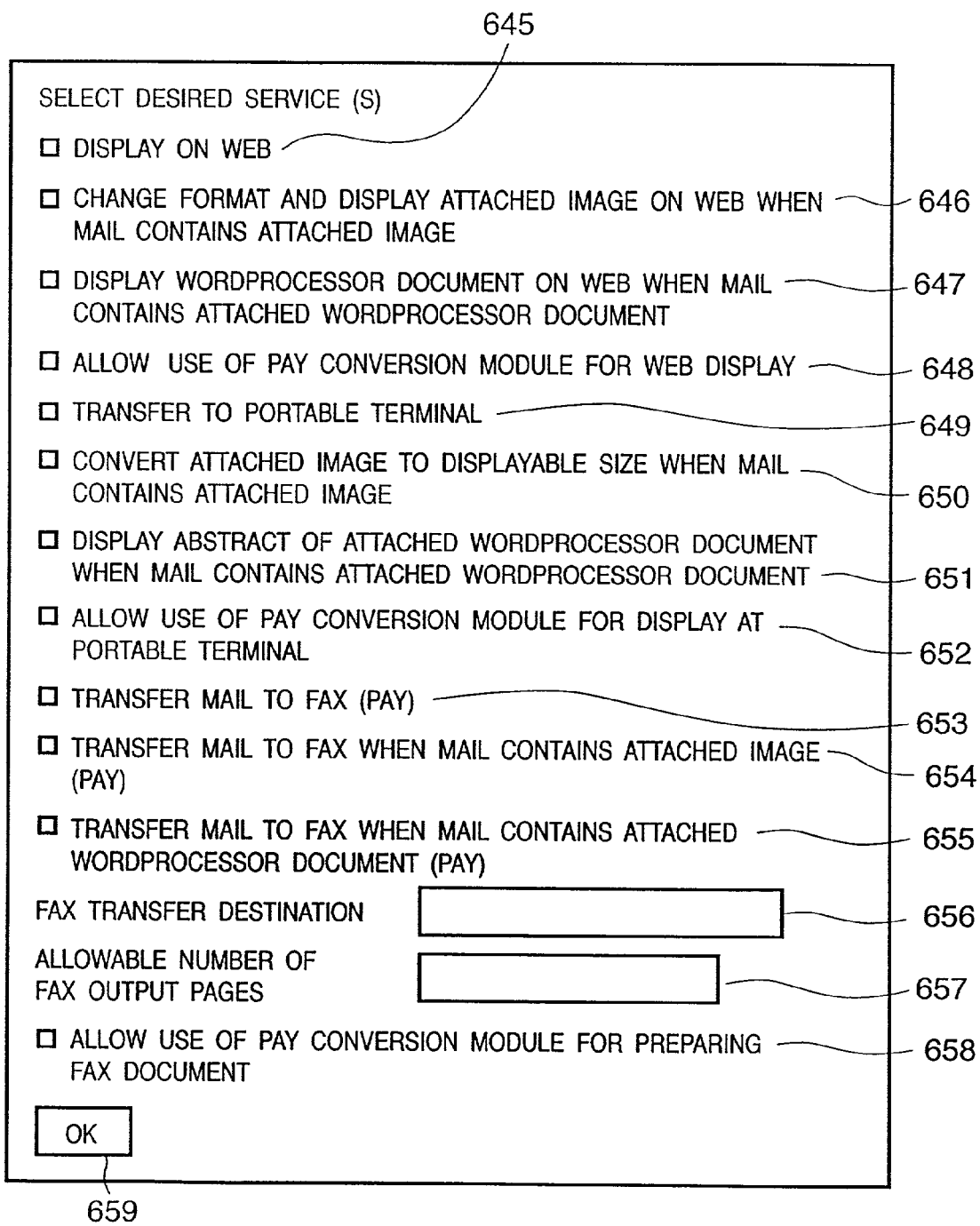
FIG. 23 is a view showing a dialog for selecting services in the Web server in the net mail service according to this embodiment.

When a "change service used" 644 in FIG. 22 is clicked, a window shown in FIG. 23 is displayed. The window in FIG. 23 is a window for setting a service wanted by the user. The user can set information for items 645 to 658, as needed. The user conversion setting table 706e is created on the basis of the contents set using the window shown in FIG. 23.

The items 648, 652, and 658 are used to set whether a pay conversion module is used for automatic conversion.

The item 656 is used to designate a transfer destination when the item 653 is checked and the FAX transfer service is used. The user can select one of the home, office, and portable telephone, for which the FAX number is designated. Since transfer to the FAX machine is a pay service, the maximum number of FAX pages can be designated in the input box 653 in order to prevent output of a large number of FAX pages and to suppress the FAX charge.

<Data Display by Web>

Figure 25:
FIG. 25 is a view showing a display example of reception mail in the Web server in the net mail service according to this embodiment.

A "display mail contents" 605 in FIG. 16 is clicked to display a window in FIG. 24 (steps S108 and S109). The list of mail messages converted into the Web format in accordance with the user settings is displayed. When one of individual mail messages 660 whose "From" and "Subject" are displayed is selected, the data entity (HTML file and attached image file) stored in the net database is displayed, as shown in FIG. 25. FIG. 25 shows the mail contents converted into the Web format. When the item 646 in FIG. 23 is checked and mail contains an attached image, the image in addition to the mail text is displayed, as shown in FIG. 25. When the item 647 in FIG. 23 is checked, the contents of the wordprocessor document are displayed following the mail text.

<Data Display at Portable Terminal>

When the item 649 in FIG. 23 is checked, mail is sent to the portable terminal. When the item 650 in FIG. 23 is checked, an image format representable at the portable terminal specified by the items 636, 637, and 638 in FIG. 21 (portable terminal specified by the user portable terminal information table 706d) is checked by looking up the portable terminal performance table 706g. The image attached to the mail is converted into this format and sent to the portable terminal. When the item 651 in FIG. 23 is checked, the abstract of the wordprocessor document is displayed following the mail text.

<Data Display at FAX Machine>

When one of the items 653, 654, and 655 in FIG. 23 is checked, only the mail text, attached image, or attached wordprocessor document is transmitted by FAX. A cover page representing the destination set in FIGS. 19, 20, and 21 is attached for the FAX location designated by the item 656.

<Mail Conversion Service>

Figure 26:
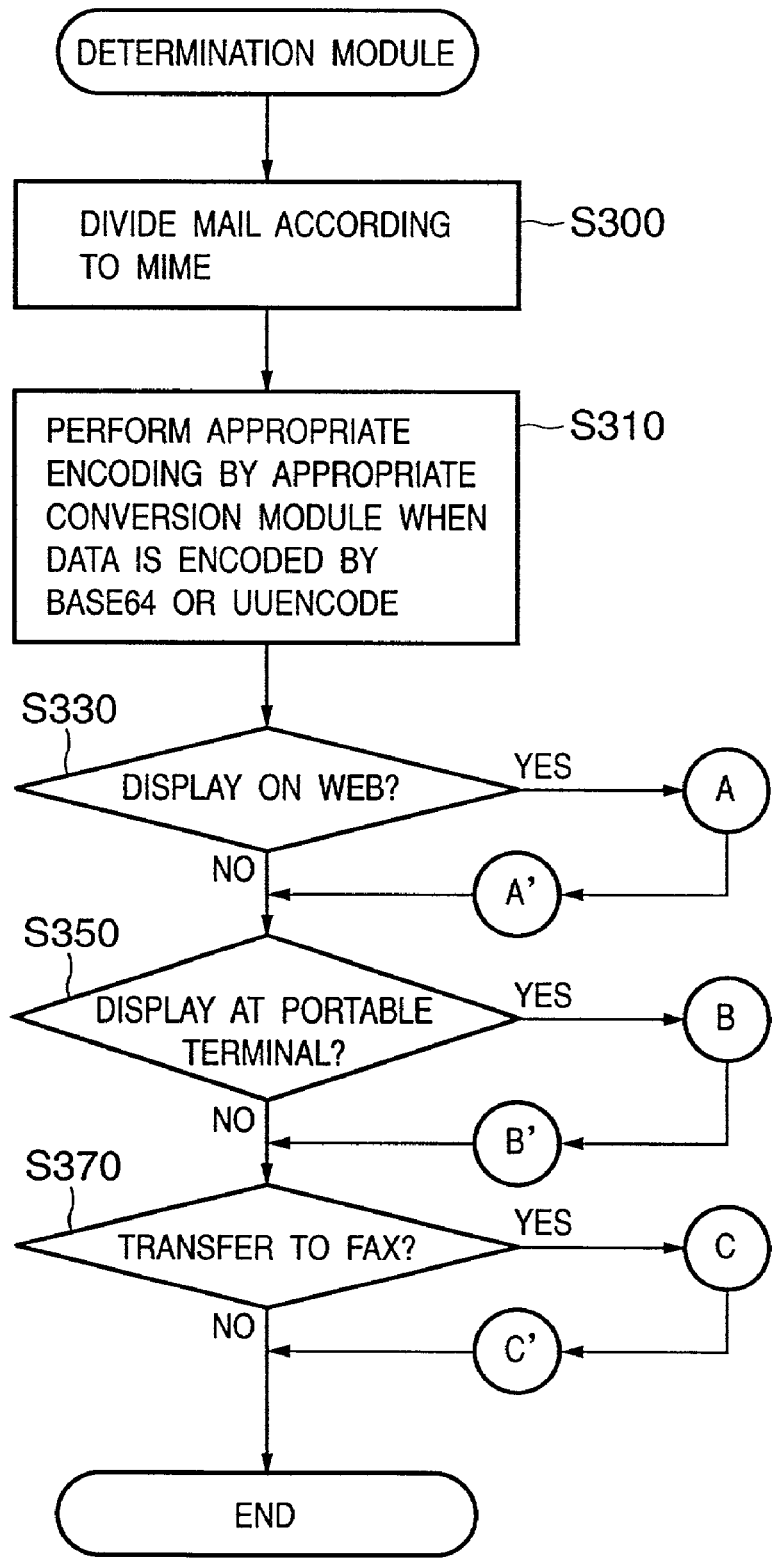
FIG. 26 is a flow chart for explaining processing of the determination module according to this embodiment.

A mail conversion service mechanism for allowing display of data at the Web server, portable terminal, and FAX machine will be described below. FIG. 26 is a flow chart showing the processing flow starting from arrival of mail to the determination module 200 upon reception of the mail by the mail server.

Figure 27:
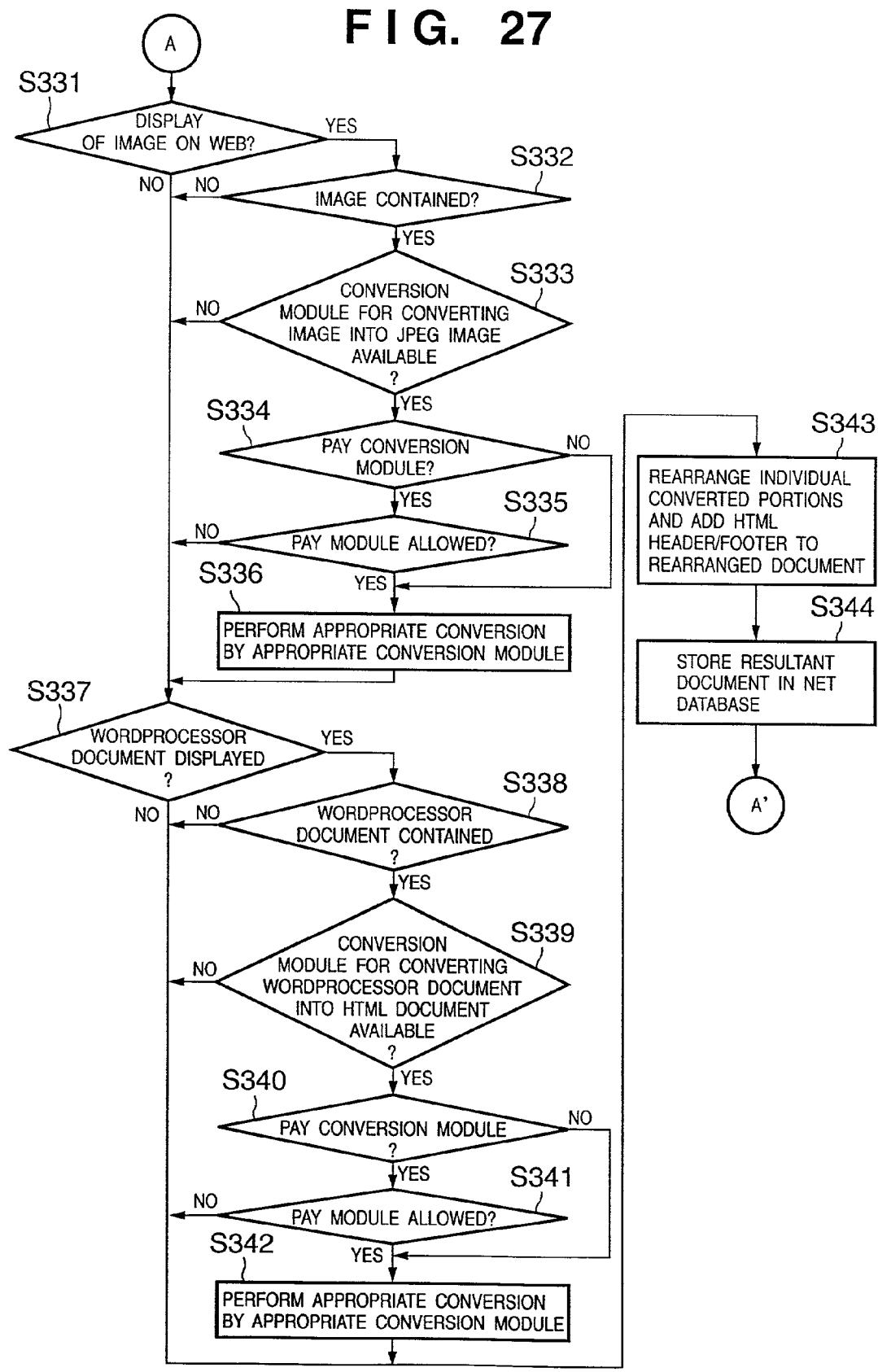
FIG. 27 is a flow chart for explaining processing for preparing data displayable on the Web.

When the "Content-Type" of the mail is determined as a "multipart", including mail which cannot be represented at the portable terminal, the mail is divided into the parts using a "boundary" (step S300). If a conversion module capable of encoding method (normally Base64 or Uuencode) specified in "Content-Transfer-Encoding" is available, the encoded data is decoded (step S310). Conversion for the respective media shown in FIGS. 27, 28, and 29 is done. More specifically, to display the mail by the Web server, the flow branches from step S330 to start processing shown in FIG. 27. To display the mail at the portable terminal, the flow branches from step S350 to start processing shown in FIG. 28. To display the mail at the FAX machine, the flow branches from step S370 to start processing shown in FIG. 29.

Whether the mail is displayed by the Web server, portable terminal or FAX machine is determined by acquiring the user ID from the mail recipient, searching the corresponding user conversion setting table 706e on the basis of this user ID, and checking the set contents of the table.

As described with reference to FIG. 1, in a system which provides the fixed service for electronic mail transfer, one conversion table (the user conversion table 700 common to all the users) is arranged in the system, and the set contents of this table are checked. Steps S330 to S370 in the flow chart of FIG. 26 may be omitted, and data conversion processing for a predetermined medium may be done unconditionally.

<Conversion of Data into Format Displayable by Web>

FIG. 27 is a flow chart for forming display data by the Web. The mail text need not be converted, and data to be converted are an image and wordprocessor document attached to the mail. When the user sets to display an image on the Web (step S331), whether the data divided in step S300 contain an image is determined in accordance with the "Content-Type" and name extension (step S332). When the divided data include image data, the "Content-Type" of the image and its name extension are compared with the input formats (MIME) and input formats (extension) of the conversion module table 706f to search for an appropriate conversion module for converting this image into a JPEG image (step S333). If an appropriate conversion module is found, whether price of the conversion module is set to 0 (zero) is determined (step S334). If the module is a pay module, whether the user allows use of a pay module is checked in accordance with the item of the user conversion setting table 706e (step S335). If the conversion module is free or the user allows use of a pay module, the appropriate conversion module converts the image into the JPEG image (step S336). When the used conversion module is a pay module, the charge for the pay conversion module is added to the charge record of the user information table 706a.

When the user sets to display a wordprocessor document on the Web (step S337), whether the data divided in step S300 include a wordprocessor document is determined in accordance with the "Content-Type" and name extension (step S338). When the divided data include wordprocessor document, the "Content-Type" of the wordprocessor document and its name extension are compared with the input formats (MIME) and input formats (extension) of the conversion module tables 706f to search for an appropriate conversion module for converting this wordprocessor document into an HTML document (step S339). In this embodiment, the wordprocessor document is converted into an HTML document in order to display the wordprocessor document on the Web browser. If an appropriate conversion module is found, whether price of the conversion module table is set to 0 (zero) is determined (step S340). If the module is a pay module, whether the user allows use of a pay module is checked in accordance with the item of the user conversion setting table 706e (step S341). If the conversion module is free or the user allows use of a pay module, the appropriate conversion module converts the wordprocessor document into the HTML document (step S342). When the used conversion module is a pay module, the charge for the pay conversion module is added to the charge record of the user information table 706a.

The individual converted portions and portions not subjected to conversion are rearranged in accordance with the original mail, and an HTML header having the "Subject" content as a title tag is attached to the rearranged data to prepare a Web page (step S343). The resultant Web page is stored in the net database (step S344).

The Web page thus stored is accessed by the mail recipient using the personal computer and transmitted to this user. The information recipient can acquire information to be received by tracing the links from a predetermined URL via the Web server 700 which provides World Wide Web information.

<Conversion into Data Displayable at Portable Terminal>

Figure 28A:
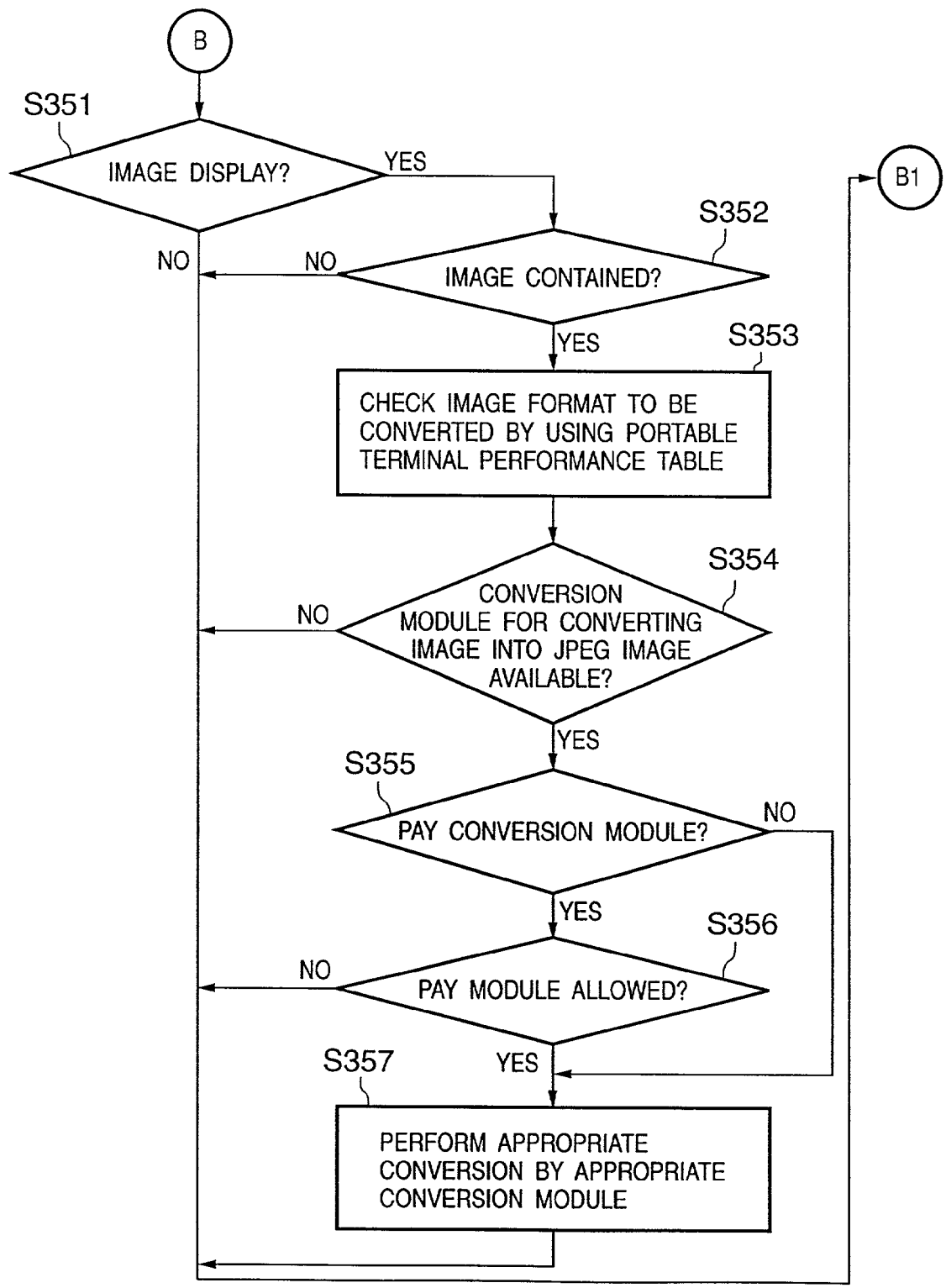
FIGS. 28A and 28B are flow charts for explaining processing for preparing data displayable on a portable terminal.
Figure 28B:
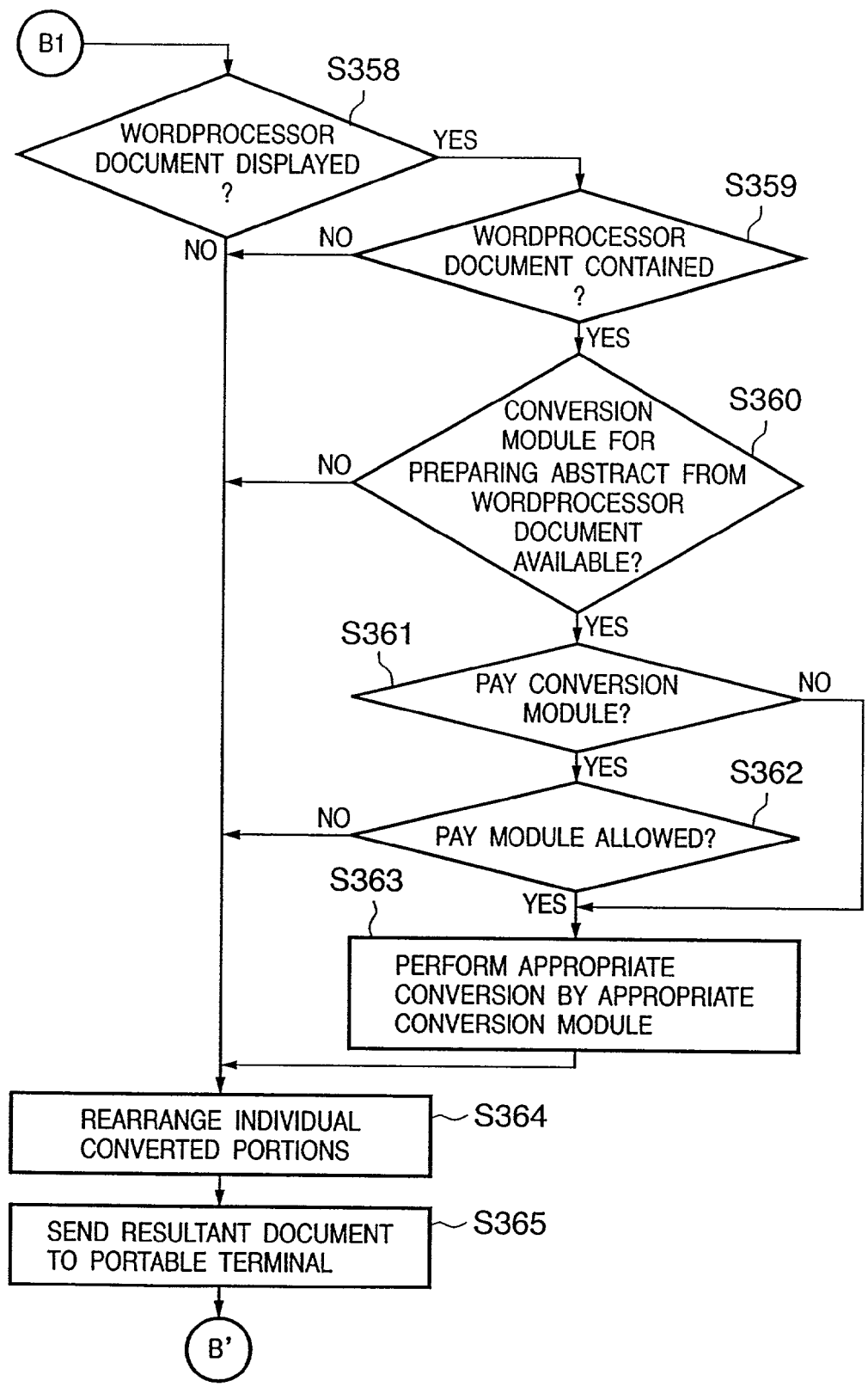

FIGS. 28A and 28B are flow charts for preparing display data at the portable terminal. The mail text need not be converted, and data which require conversion are only an attached image and wordprocessor document. When the user sets to display an image on the portable terminal (step S351), whether an image is contained in each data divided in step S300 is determined in accordance with the "Content-Type" and name extension (step S352). If YES in step S352, the portable terminal performance table 706g is looked up to check the output image format (step S353).

The "Content-Type" and name extension of the image are compared with the input formats (MIME) and input formats (extension) of the conversion module table 706f to search for an appropriate conversion module for converting the image into an appropriate format (step S354). Examples of the appropriate image format are GIF (Graphics Interchange Format), PNG (Portable Network Graphics) or BMP (Bit-MaP) currently supported by portable telephones. If another format (e.g., JPEG) is supported in the near future, its image format is included in the appropriate image formats. If an appropriate conversion module is found, whether price of the conversion module is set to 0 (zero) is determined (step S355). If the module is a pay module, whether the user allows use of a pay module is checked in accordance with the item of the user conversion setting table 706e (step S356). If the conversion module is free or the user allows use of a pay module, the appropriate conversion module performs conversion (step S357). When the used conversion module is a pay module, the charge for the pay conversion module is added to the charge record of the user information table 706a.

When the user sets to display a wordprocessor document on the portable terminal (step S358), whether the data divided in step S300 include a wordprocessor document is determined in accordance with the "Content-Type" and name extension (step S359) When the divided data include wordprocessor document, the "Content-Type" of the wordprocessor document and its name extension are compared with the input formats (MIME) and input formats (extension) of the conversion module tables 706f to search for an appropriate conversion module for preparing abstract from this wordprocessor document (step S360). If an appropriate conversion module is found, whether price of the conversion module is set to 0 (zero) is determined (step S361). If the module is a pay module, whether the user allows use of a pay module is checked in accordance with the item of the user conversion setting table 706e (step S341). If the conversion module is free or the user allows use of a pay module, the appropriate conversion module performs conversion (step S363). When the used conversion module is a pay module, the charge for the pay conversion module is added to the charge record of the user information table.

The individual converted portions and portions not subjected to conversion are rearranged in accordance with the original mail, and the document to be sent to the portable terminal is prepared (step S364). The resultant document is stored in a net database and sent to the portable terminal designated by the user (step S365).

<Conversion into Data Transmittable to FAX Machine>

Figure 29A:
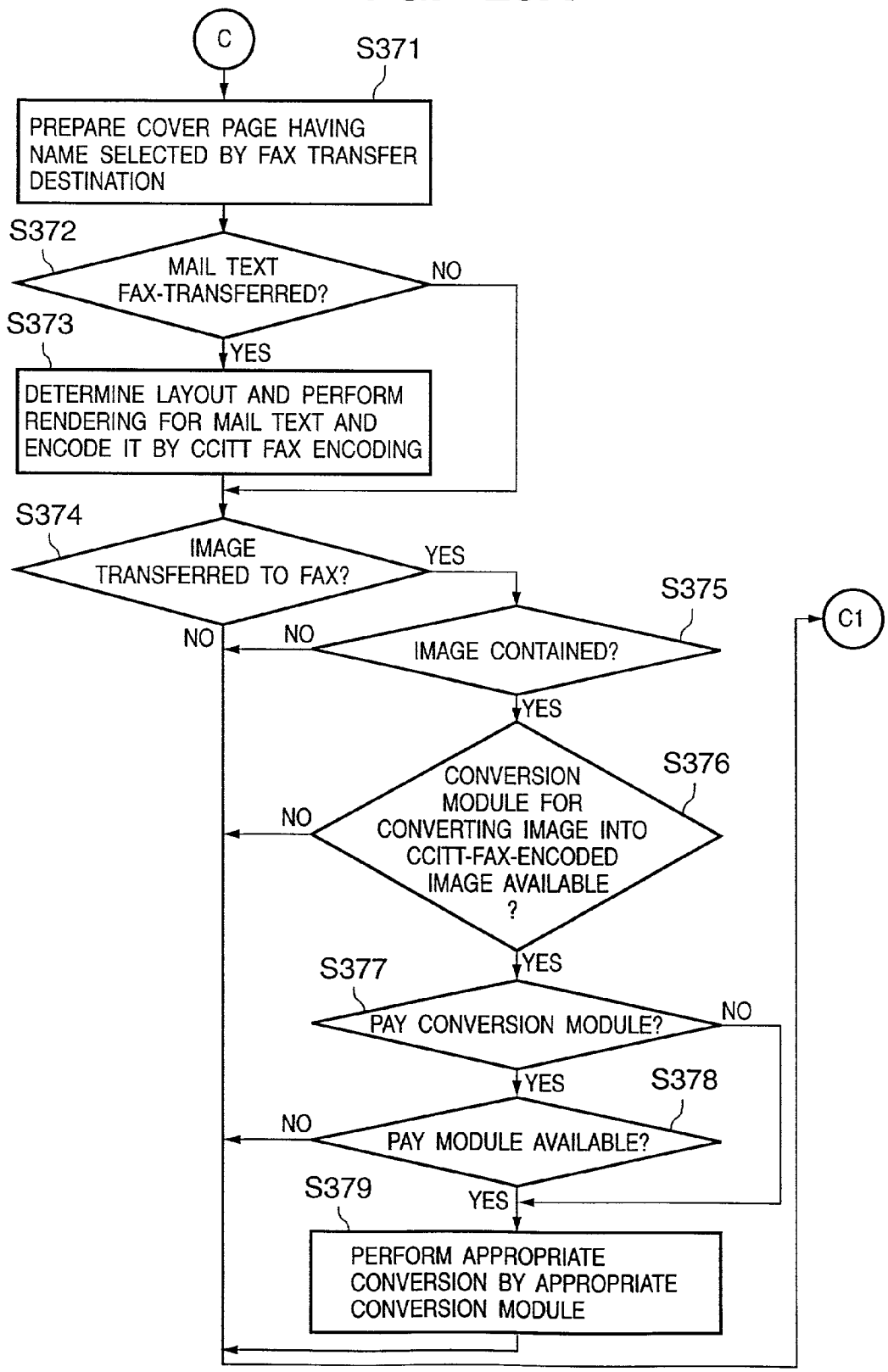
FIGS. 29A and 29B are flow charts for explaining processing for preparing data transmittable to a FAX machine.
Figure 29B:
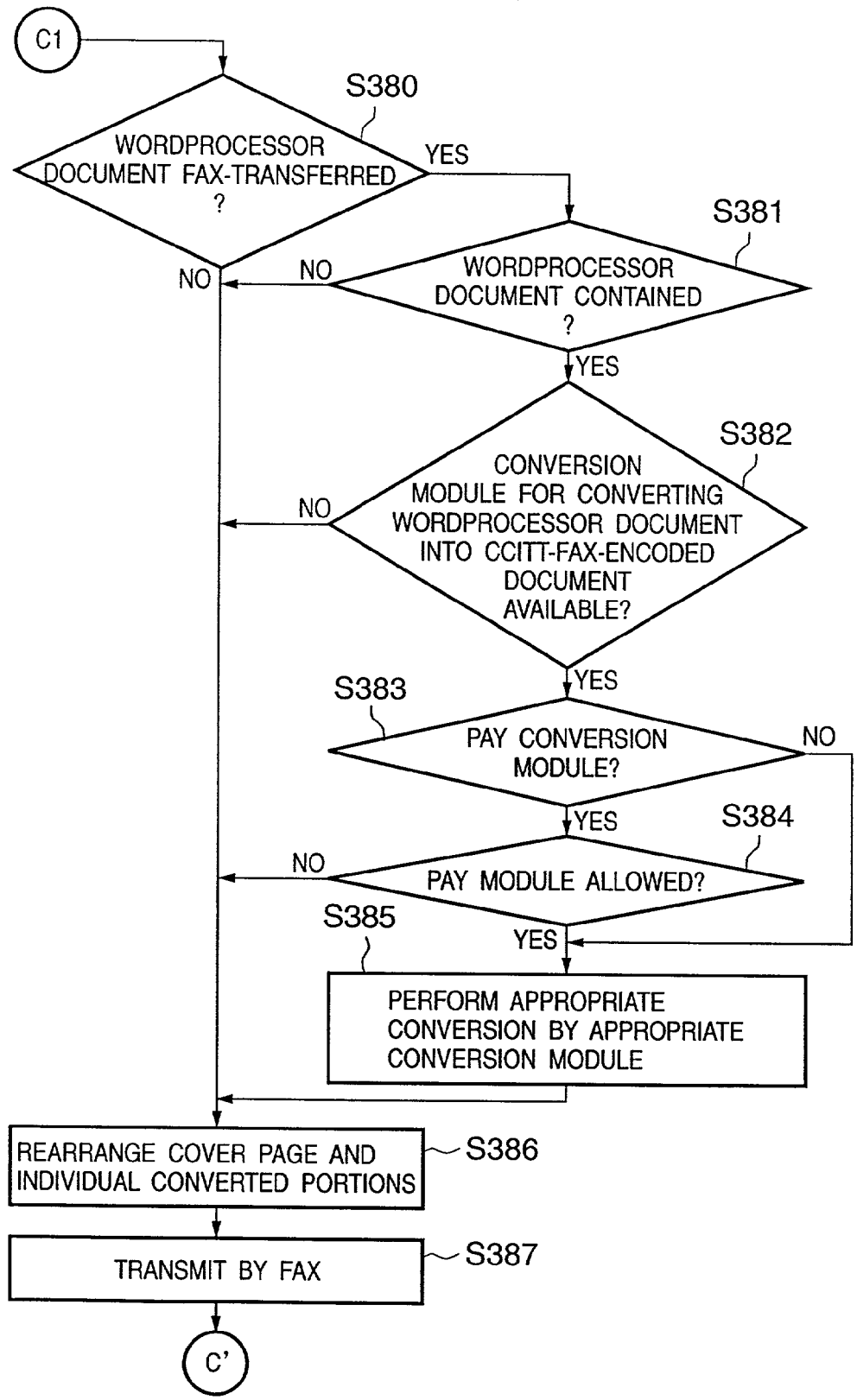

FIGS. 29A and 29B are flow charts for preparing display data to be set via FAX. A cover page representing the location selected for the FAX transfer destination by the user is prepared (step S371). When the user sets to FAX-transmit the mail text, the layout of the mail text is rendered and encoded by CCITT FAX encoding (steps S372 and S373). When the user sets FAX-transmit an image (step S374), whether the data divided in step S300 include an image is determined in accordance with the "Content-Type" and name extension (step S375). When the divided data include an image, the "Content-Type" of the image and its name extension are compared with the input formats (MIME) and input formats (extension) of the conversion module tables 706f to search for an appropriate conversion module for converting the image into CCITT FAX encoding data (step S376). If an appropriate conversion module is found, whether price of the conversion module table is set to 0 (zero) is determined (step S377). If the module is a pay module, whether the user allows use of a pay module is checked in accordance with the item of the user conversion setting table 706e (step S378) If the conversion module is free or the user allows use of a pay module, the appropriate conversion module performs conversion (conversion into CCITT-FAX-encoded data (step S379). When the used conversion module is a pay module, the charge for the pay conversion module is added to the charge record of the user information table 706a (step S379).

When the user sets to FAX-transmit a wordprocessor document (step S380), whether the data divided in step S300 contain a wordprocessor document is determined in accordance with the "Content-Type" and name extension (step S381). When the divided data include wordprocessor document, the "Content-Type" of the wordprocessor document and its name extension are compared with the input formats (MIME) and input formats (extension) of the conversion module tables 706f to search for an appropriate conversion module for converting this wordprocessor document into CCITT-FAX-encoded data (step S382). If an appropriate conversion module is found, whether price of the conversion module table is set to 0 (zero) is determined (step S383). If the module is a pay module, whether the user allows use of a pay module is checked in accordance with the item of the user conversion setting table 706e (step S384). If the conversion module is free or the user allows use of a pay module, the appropriate conversion module performs appropriate conversion (step S385). When the used conversion module is a pay module, the charge for the pay conversion module is added to the charge record of the user information table 706a (step S385).

The individual converted portions and portions not subjected to conversion are rearranged in accordance with the original mail, and the cover page is attached to the rearranged data to prepare a document to be sent by FAX (step S386). The resultant document is sent to the FAX machine designated by the user (step S387).

Steps S332 to S336, S352 to S357, and S374 to S379 are repeated by the number of images. When pay modules and free modules are mixed, and use of a pay module is not allowed, images convertible by free modules are converted into data for transfer.

Steps S338 to S342, S359 to S363, and S381 to S385 are repeated by the number of wordprocessor documents. When pay modules and free modules are mixed, and use of a pay module is not allowed, wordprocessor documents convertible by free modules are converted into data for transfer.

As described above, according to this embodiment, the user conversion setting table 706e (FIG. 11) including designation for electronic mail destination and the like is retained for each user. The destination of the electronic mail received via the mail server 100 is determined on the basis of the settings of the user conversion table of the destination user of the electronic mail (determination module 200, and steps S330, S350, and S370). Output data suitable for the output form of the determined destination is generated on the basis of the contents of the received electronic mail (FIGS. 27 to 29, determination module 200, and conversion modules 300 and 300'). The generated output data is provided to the designated destination (FIGS. 27 to 29B, and steps S344, S365, and S387).

According to this embodiment, mail is transmitted after the contents of the electronic mail are analyzed and data conversion is performed for the divided files in accordance with the capacity of the electronic mail receiving terminal. Therefore, optimal information can be provided to the electronic mail receiving terminal.

More specifically, according to this embodiment, when information, which cannot be mapped or displayed under a terminal environment in which the user receives electronic mail, is transmitted, abstract of this mail and a method of acquiring information are notified to the user. The information which cannot be mapped or displayed in the user environment can be provided to a variety of forms. The electronic mail use environment can be greatly improved.

<Other Embodiment>

The object of the present invention can also be achieved by supplying a storage medium which stores software program codes for implementing the functions of the above-described embodiments to a system or apparatus and causing the computer (or a CPU or MPU) of the system or apparatus to read out and execute the program codes stored in the storage medium.

In this case, the program codes read out from the storage medium implement the functions of the above-described embodiments by themselves, and the storage medium which stores the program codes constitutes the present invention.

As the storage medium for supplying the program codes, for example, a floppy disk, hard disk, optical disk, magnetooptical disk, CD-ROM, CD-R, magnetic tape, nonvolatile memory card, ROM, DVD or the like can be used.

The functions of the above-described embodiment are implemented not only when the readout program codes are executed by the computer but also when the operating system (OS) running on the computer performs part or all of actual processing on the basis of the instructions of the program codes.

The functions of the above-described embodiments are also implemented when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

As has been described above, according to the present invention, the capacity of the receiving-side terminal is determined, the contents of transmission information are converted and reconfigured to match the capacity of the receiving-side terminal. Therefore, appropriate information can be provided to the transmission information receiving terminal.

As many apparently widely different embodiments of the present invention can be made without departing from the spirit and scope thereof, it is to be understood that the invention is not limited to the specific embodiments thereof except as defined in the appended claims.

What is claimed is:

1. An information providing apparatus capable of executing a communication via a network, comprising:
   registering means for registering one or more terminal and a permission/inhibition of charge, for each user;
   reception means for receiving transmission information to a user from an external terminal;
   decision means for deciding, from the one or more terminal registered for the user by said registering means, a destination terminal of the transmission information received by said reception means;
   selection means for selecting a conversion module which converts a format of the transmission information into a format which matches processing ability of the decided destination terminal;
   designation means for sending the transmission information to the selected conversion module so as to make the selected conversion module convert the transmission information; and
   transferring means for transferring the converted transmission information to the decided destination terminal; and
   inhibiting means for, when a user sets to inhibit charge, inhibiting said selection means from selecting conversion module which accrues charge.

2. The apparatus according to claim 1, wherein
   the apparatus further comprises division means for dividing the data contained in the transmission information in accordance with types of contents of the data,
   said selection means selects a conversion module for each divided data, and
   said transferring means integrates the data whose formats are converted by selected conversion module and transfers the integrated data to the destination.

3. The apparatus according to claim 2, wherein the transmission information is electronic mail, and the data divided in accordance with the types are attached files contained in the electronic mail.

4. The apparatus according to claim 2, wherein said transferring means integrates the converted data in accordance with a data order of the transmission information.

5. The apparatus according to claim 1, wherein said selection means selects a conversion module on the basis of a data format of the data contained in the transmission information and a data format of the destination.

6. The apparatus according to claim 5, wherein when the destination is a World Wide Web information providing apparatus, said selection means selects a conversion module which converts image data contained in the transmission information into JPEG data and converts wordprocessor document data into HTML format data.

7. The apparatus according to claim 5, wherein when the destination is a portable terminal, said selection module selects a conversion module which converts image data contained in the transmission information into a format displayable on the portable terminal and converts wordprocessor document data into text string data representing a subject of the document.

8. The apparatus according to claim 5, further comprising charging means for, when said conversion module executes conversion which accrues charge, executing charge processing.

9. An information providing method comprising:
   a reception step of receiving transmission information to a user from an external terminal;
   a decision step of deciding, from one or more terminal registered for the user in registering unit, a destination terminal of the transmission information received in the reception step;
   a selection step of selecting a conversion module which converts a format of the transmission information into a format which matches processing ability of the decided destination terminal;
   a designation step of sending the transmission information to the selected conversion module so as to make the selected conversion module convert the transmission information; and
   a transferring step of transferring the converted transmission information to the decided destination terminal; and
   an inhibiting step of, when a user sets to inhibit charge, inhibiting said selection step from selecting conversion module which accrues charge.

10. A computer-readable storage medium which stores a control program for causing a computer to execute an information providing method comprising:
    a reception step of receiving transmission information to a user from an external terminal;
    a decision step of deciding, from one or more terminal registered for the user in registering unit, a destination terminal of the transmission information received in the reception step;
    a selection step of selecting a conversion module which converts a format of the transmission information into a format which matches processing ability of the decided destination terminal;
    a designation step of sending the transmission information to the selected conversion module so as to make the selected conversion module convert the transmission information; and
    a transferring step of transferring the converted transmission information to the decided destination terminal; and
    an inhibiting step of, when a user sets to inhibit charge, inhibiting said selection step from selecting conversion module which accrues charge.

* * * * *